United States Patent
Rao et al.

(10) Patent No.: US 11,158,176 B2
(45) Date of Patent: Oct. 26, 2021

(54) DISTRIBUTED REAL-TIME SECURITY MONITORING AND ALERTING

(71) Applicant: NEC Laboratories America, Inc., Princeton, NJ (US)

(72) Inventors: Kunal Rao, Monroe, NJ (US); Giuseppe Coviello, Princeton, NJ (US); Srimat Chakradhar, Manalapan, NJ (US); Min Feng, Monmouth Junction, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 16/808,722

(22) Filed: Mar. 4, 2020

(65) Prior Publication Data
US 2020/0294376 A1   Sep. 17, 2020

Related U.S. Application Data

(60) Provisional application No. 62/816,444, filed on Mar. 11, 2019.

(51) Int. Cl.
*G08B 13/196*   (2006.01)

(52) U.S. Cl.
CPC .  *G08B 13/19663* (2013.01); *G08B 13/19645* (2013.01)

(58) Field of Classification Search
CPC .............................. G08B 13/00; G08B 13/196
See application file for complete search history.

(56) References Cited

U.S. PATENT DOCUMENTS

| 7,158,776 | B1 * | 1/2007 | Estes | H04L 63/02 380/247 |
| 8,876,608 | B2 * | 11/2014 | Shepherd | G07F 17/3237 463/42 |
| 9,407,620 | B2 * | 8/2016 | Miu | G06Q 20/384 |
| 9,773,364 | B2 * | 9/2017 | Kerning | G07C 9/00563 |
| 9,832,206 | B2 * | 11/2017 | Mare | H04W 12/06 |

(Continued)

OTHER PUBLICATIONS

Better Tomorrow, SesaMe, Abraxas. Anyvision, 2020. Retrieved from the internet on Mar. 4, 2020: https://www.anyvision.com.

(Continued)

*Primary Examiner* — K. Wong
(74) *Attorney, Agent, or Firm* — Joseph Kolodka

(57) ABSTRACT

Systems and methods are disclosed for distributed real-time security monitoring and alerting. The methods include transmitting a selected portion of biometrics data as a watchlist to each worker unit. The portion of biometrics data is selected in response to respective characteristic data received from each worker unit. Facial recognition data is received from each worker unit. The facial recognition data includes a person of interest with an associated match confidence value calculated by each worker unit based on respective watchlists received by each worker unit. A combined match confidence value is calculated between a same person of interest identified in multiple facial recognition data received from each worker unit and the biometric data associated with an individual. The combined match confidence value is calculated in response to match confidence values associated with the same person of interest in respective facial recognition data being below a match confidence threshold.

20 Claims, 16 Drawing Sheets

(56) References Cited

U.S. PATENT DOCUMENTS 9,875,482 B1 * 1/2018 Mello ................ G06Q 30/0207
10,026,283 B1 * 7/2018 Liu .................. G08B 13/19602

OTHER PUBLICATIONS

Biometric Devices & Automotive. Idemia, 2020. Retrieved from the internet on Mar. 4, 2020: https://www.idemia.com/market/biometric-devices-automotive.

Identity Authentication through Face Recognition. Facefirst, 2019. Retrieved from the internet on Mar. 4, 2020: https://www.facefirst.com/solutions/identity-authentication-through-face-recognition/.

FaceVACS-VideoScan, FaceVACS-VideoScan ES, FaceVACS-DBScan ID, FaceVACS-DBScan LE, FaceVACS-Entry, FaceVACS Technology. Cognitec Systems GmbH, 2020. Retrieved from the internet on Mar. 4, 2020: https://www.cognitec.com/products-overview.html.

* cited by examiner

DISTRIBUTED REAL-TIME SECURITY MONITORING AND ALERTING

RELATED APPLICATION INFORMATION

This application claims priority to U.S. Provisional Patent Application No. 62/816,444 filed on Mar. 11, 2019, incorporated herein by reference in its entirety.

BACKGROUND

Technical Field

The present invention relates to security monitoring and more particularly to distributed real-time security monitoring and alerting.

Description of the Related Art

Security systems utilizing imaging devices are used to secure locations and identify persons of interest. Processing of video captured by imaging devices located throughout a facility or public space is performed at a central monitoring location to identify faces with individuals listed in a watchlist. However, a centralized processing approach prevents easy scaling of imaging device. Adding new imaging devices increases the workload at the central monitoring location. Thus, performance can be quickly degraded if a large number of imaging devices are installed.

SUMMARY

According to an aspect of the present invention, a method is provided for distributed real-time security monitoring and alerting. The method includes transmitting a selected portion of biometrics data as a watchlist to each worker unit. The portion of biometrics data is selected in response to respective characteristic data received from each worker unit. Additionally, facial recognition data is received from each worker unit. The facial recognition data includes a person of interest with an associated match confidence value calculated by each worker unit based on respective watchlists received by each worker unit. A combined match confidence value is calculated between a same person of interest identified in multiple facial recognition data received from each worker unit and the biometric data associated with an individual, the combined match confidence value being calculated in response to match confidence values associated with the same person of interest in respective facial recognition data being below a match confidence threshold.

According to another aspect of the present invention, a method is provided for distributed real-time security monitoring and alerting in which characteristic data identifying at least a location and monitoring focus of a worker unit is transmitted to a management server. At least one watchlist is received by the worker unit from the management server. The watchlist includes biometric data of individuals representing a portion of biometric data managed by the management server selected based on the transmitted characteristic data. A person of interest is identified using facial recognition based on the biometric data of the watchlist received from the management server. Additionally, the person of interest is labeled in the image data including calculating a match confidence value; and an alert request including the image data having the labeled person of interest is transmitted to the management server.

According to yet another aspect of the present invention, a system is provided for distributed security monitoring. The system includes one or more worker units having an imaging system, and positioned to monitor individuals in a space, and a management server. The management server is configured to transmit a selected portion of biometrics data as a watchlist to each worker unit. The portion of biometrics data is selected in response to respective characteristic data received from each worker unit. Additionally, the management server is configured to receive facial recognition data from each worker unit. The facial recognition data includes a person of interest with an associated match confidence value calculated by each worker unit based on respective watchlists received by each worker unit. The management server calculates a combined match confidence value between a same person of interest identified in multiple facial recognition data received from each worker unit and the biometric data associated with an individual in response to match confidence values associated with the same person of interest in respective facial recognition data being below a match confidence threshold. An alert is issued in response to at least one of a match confidence value or a combined match confidence value at least equaling the match threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures.

DETAILED DESCRIPTION OF PREFERRED EMBODIMENTS

Figure 1:
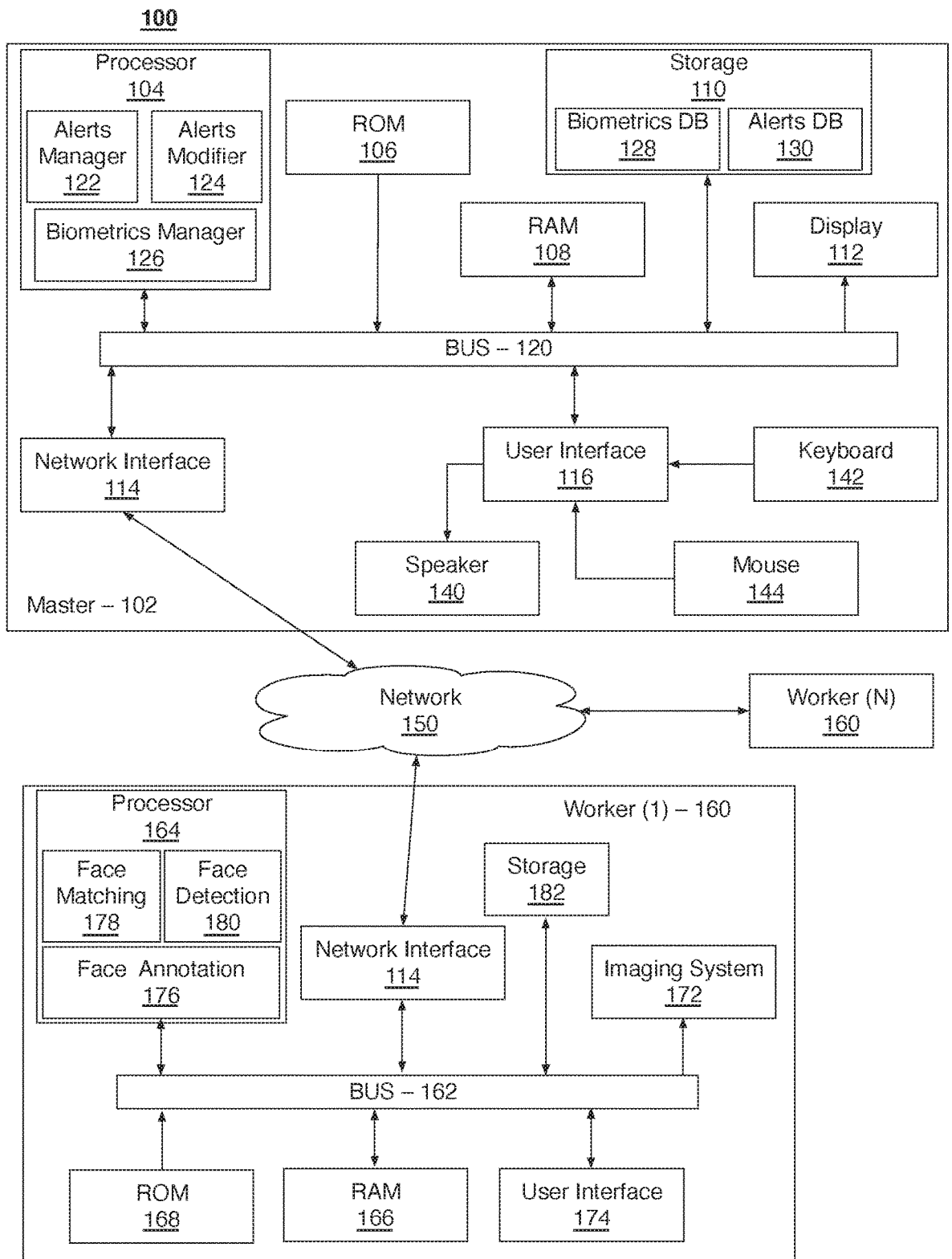
FIG. 1 is a block representation illustrating a distributed monitoring and alerting system, in accordance with the present invention.

In accordance with embodiments of the present invention, systems and methods are provided for distributed real-time monitoring and alerting.

In one embodiment, a first component, designated as a master unit, implements and manages one or more watchlists of individuals and biometric data (facial information, for example) related to the individuals. A plurality of second components, designated as worker units, are coupled to imaging devices, such as security cameras. Each worker unit processes image data (e.g., video feeds) received from a connected camera to isolate regions of interest, e.g., regions including faces or partial faces, match any detected faces against the biometric data received from the master unit, and label each face before transmitting the facial data to the master unit. Upon receiving annotated facial data, the master unit can issue an alert notifying security personnel of a detection of an individual from a watchlist.

By having worker units performing the image processing, data traffic on the network can be minimized. Video feeds do not need to be transmitted from a plurality of cameras to a single processing unit. Instead, each camera can, in some embodiment, be directly coupled to a worker unit. Moreover, each worker unit can be coupled to an individual camera, thus the workload for each worker unit can be easily maintained within optimal capabilities of the processing resources. Consequently, the system can be easily scaled with more worker/camera units while still maintaining processing efficiency.

Additionally, in some embodiments, the distributed monitoring system can be configured to detect individuals that are not on a watchlist. For example, an embodiment can be configured with a biometric database of a group of individuals authorized to enter a particular secured location. These authorized individuals are included in a watchlist. The worker units monitoring the secured location can be configured, in this embodiment, to disregard individuals on the watchlist and instead identify individuals that are not on the watchlist. In this way, the present embodiment can facilitate access to a secured location to only authorized individuals while preventing access to non-authorized individuals. In the present embodiment, worker units monitoring different secured areas can be provided with different watchlist corresponding to the individuals authorized to enter the respective secured areas.

In some embodiments, the master unit maintains a database of biometric data associated with one or more individuals. The biometric data can be selected by a biometrics manager of the master unit based on characteristics of each worker unit. The selected biometrics data can be transmitted as a watchlist to the respective worker units. Thus, each worker unit can have watchlists that are customized based on each worker unit's particular location and monitoring focus.

In this way, a worker unit tasked with monitoring a secured space can be provided with biometric data of individuals authorized to enter the secured space, such as, for example, employees; these individuals can thus be ignored by the worker unit. Conversely, alerts can be triggered when an individual that is not on the watchlist attempts to enter the secured space. Additionally, not all employees may have the same level of access, thus worker units monitoring one secured space can have a different watchlist than worker units monitoring a second secured space even if the spaces are associated with the same institution.

Also, as the biometrics database is updated, as when individuals are added or removed, for example, that may cause changes to the customized watchlists sent to each worker unit, the master unit can initiate transfer of the updated watchlists to the appropriate worker units. This feature can facilitate rapid, substantially instantaneous, updating of watchlists at all worker units when changes are made to the biometrics database.

In addition to location and monitoring focus, other characteristics of an individual worker unit can be used as characteristics for determining which biometric data to include in a watchlist. For example, the capabilities of the imaging system, (infrared, monochrome or color imaging, high pixel count, etc.), and available resources (free storage space, processor bandwidth, etc.), etc. In some embodiments, the worker unit provides the characteristics to the master unit during initial registration of the worker unit, and henceforth the worker unit can provide a unique identifier that the master unit associates with the characteristics.

For simplicity, individuals that trigger an alert will be identified as persons of interest hereinafter. Thus, in one embodiment where individuals on a watchlist trigger an alert, those watchlisted individuals are referred to hereinafter as persons of interest. In embodiments where individuals not listed on a watchlist trigger alerts, those non-watchlisted individuals are referred to hereinafter as persons of interest, as well. Non-watchlisted individuals can, in some embodiments, trigger alerts in situations where the watchlist includes biometric information of individuals, such as, for example, employees, that are authorized to enter an area. In such a case individuals not on the watchlist are not authorized to enter the area and thus if detected would trigger an alert.

In some embodiments, where multiple worker units are present and monitoring the same general area, perhaps from different angles or perspectives, a facial match of the same individual made by each of the multiple worker units can be combined at the master unit to increase the match confidence level. As each worker unit has a different view of the individual, some views may yield a better, or higher confidence, match of the individual then others. Additionally, the different angles and perspectives can bring different facial features into focus. For example, features obscured from view at one angle can be clear from another angle. Thus, by combining the various views at the master unit the number of matching biometric elements can be increased, resulting in an increased match confidence for the individual. Accordingly, while, individually, each worker unit may arrive at a somewhat low confidence match (e.g., a match confidence below a threshold value), the combination of matched features from the multiple worker units can increase the confidence level of the match above the threshold value. In some embodiments, the combining of the low confidence matches of the multiple worker units is performed by the master unit as each match is received from the respective worker unit.

In embodiments where the match confidence can be increased by combining facial features from multiple facial matches, the worker units can have a match confidence threshold set at a lower value than the match confidence threshold set at the master unit. For example, the worker units can have a match confidence threshold set at a 0.65 value, while the master unit can have a match confidence threshold set at a 0.70 value. In this way, the worker units can be configured to present persons of interest to the master unit even though the match confidence is not at the level that would trigger an alert. The master unit, having received facial features for person of interest with lower match confidences from multiple sources (e.g., worker units), can further analyze the facial features of the person of interest by combining the facial features from the multiple sources. The master unit can continue to add additional facial feature data for the person of interest as new data is received from the worker units until the combined match confidence value of the person of interest equals or exceeds the higher match confidence threshold of the master unit.

FIG. 1 illustrates a block representation of a distributed security monitoring system 100 in accordance with an embodiment of the present invention. The distributed monitoring and alerting system 100 includes a master unit 102 coupled to one or more worker units 160 via a network 150. The network 150 can be a local area network (LAN), wide area network (WAN), Internet, or a combination of these. Additionally, the network 150 can be configured using any of the IEEE 802 family of networking protocols, for example, such as Ethernet (IEEE 802.3), Wireless LAN (IEEE 802.11), etc. and transmit data using, for example, Transmission Control Protocol (TCP), User Datagram Protocol (UDP), etc.

The master unit 102 includes a processor 104, such as, a central processing unit (CPU), a graphical processing unit (GPU), a configured field programmable gate array (FPGA), an application specific integrated circuit (ASIC), or a combination of these, for example. The processor 104 is in electrical communication, via a system bus 120, with memory devices, such as random-access memory (RAM) 106, and read-only memory (ROM) 108. The system bus 120 is also coupled to one or more mass storage devices 110, such as, for example, hard drives, solid state drives, etc. A display 112, user interface controller 116 and network interface 114 are also coupled to the system bus 120. The user interface controller 116 provides an interface between the master unit 102 and a user by way of various human interface devices (HID) such as, for example, keyboard 142, mouse 144, speakers 140, etc. The network interface 114 transmits and receives data communication between the master unit 102 and the worker units 160 via the network 150. The storage device 110 includes a biometric database 128 and an alerts manager database 130.

In some embodiments, the processor 104 functions as an alerts manager 122, an alerts modifier 124 and a biometrics manager 126, as described in further detail below. The alerts manager 122, the alerts modifier 124 and the biometrics manager 126 are also referred to collectively herein as master application instances. In embodiments where the processor 104 is a CPU, the alerts manager 122, the alerts modifier 124 and the biometrics manager 126 are implemented as program code stored on the mass storage device 110, in RAM 106, in ROM 108 or in a combination of these, and executed by the CPU. In other embodiments, the processor 104 is an FPGA that is configured to implement the alerts manager 122, the alerts modifier 124 and the biometrics manager 126 by way of particularly configured gates, thus implementing the functions in hardware. In other embodiments the alerts manager 122, the alerts modifier 124 and the biometrics manager 126 can be implemented using a combination of hardware and program code.

In some embodiments, the worker units 160 communicate with the master unit 102 over the network 150 using a network interface 170. Similar to the master unit 102, the worker units 160 include a system bus 162 providing electrical communication between a processor 164, RAM 166, ROM 168, mass storage device 182, the network interface 170, a user interface controller 174, and an imaging system 172.

In some embodiments, the processor 164 functions as a face annotation unit 176, a face matching unit 178 and a face detection unit 180, as described in further detail below. The face annotation unit 176, the face matching unit 178 and the face detection unit 180 are also referred to collectively herein as worker application instances. In embodiments where the processor 164 is a CPU, the face annotation unit 176, the face matching unit 178 and the face detection unit 180 are implemented as program code stored on the mass storage device 182, in RAM 166, in ROM 168 or in a combination of these, and executed by the CPU. In other embodiments, the processor 164 is an FPGA that is configured to implement the face annotation unit 176, the face matching unit 178 and the face detection unit 180 by way of particularly configured gates, thus implementing the functions in hardware. In other embodiments the face annotation unit 176, the face matching unit 178 and the face detection unit 180 can be implemented using a combination of hardware and program code.

In some embodiments, the imaging system 172 (e.g., digital video camera) can include an image sensor having a plurality of pixel elements arranged in a two-dimensional array. The pixel elements can be implemented as charge-coupled devices (CCD), or as complementary metal-oxide semiconductor (CMOS) elements. Additionally, the imaging system 172 can be configured to provide still images, video feeds or both. In some embodiments, the worker unit 160 can be equipped with one imaging system 172. However, other embodiments can include multiple imaging systems 172, with necessary computational resources scaled accordingly. Additionally, in some embodiments the worker unit 172 is connected to one or more imaging systems 172 by way of external interface ports (not shown), such as high definition multimedia interface (HDMI), universal serial bus (USB) or a combination thereof, for example. Other embodiments can include a worker unit 172 and an imaging system 172 integrated into a unitary body.

As shown in FIG. 1, an embodiment includes a master unit 102 and one or more worker units 160 in communication with the master unit 102 via the network 150. The master unit 102 is configured to provide watchlist management (via the biometrics manager 126) and alerts management (via the alerts manager 122 and the alerts modifier 124). Each worker unit 160, on the other hand, is configured to perform the image capture (via the imaging system 172), image analysis (via the face annotation unit 176, the face matching unit 178 and the face detection unit 180), and alerting for persons of interest.

In some embodiments, the worker unit 160 receives a watchlist when updates to the watchlist are available from the master unit 102. Thus, since the worker unit 160 includes a copy of the watchlist, the worker unit can continue to perform facial identification and matching based on the internally stored watchlist even when network communication is suspended or interrupted, for example, as can occur during a power outage or network equipment fault. Once network connectivity between the worker unit 160 and the master unit 102 is reestablished, any persons of interest detected by the worker unit can be transmitted to the master unit 102 for further action. Thus, the distributed system disclosed herein can function even with intermittent network connectivity.

In some embodiments, the system 100 depicted in FIG. 1 implements a usecase topology in which blocks representing various micro-services are inter-connected to perform the real-time monitoring and alerting of the present invention. In the usecase topology, input blocks provide data acquisition micro-services and modules implement processing micro-services.

In some embodiments, the usecase topology includes the alerts manager 122, the alerts modifier 124 and the biometrics manager 126 as application instances deployed by the master unit 102, and the face annotation unit 176, the face matching unit 178 and the face detection unit 180 as application instances deployed on each worker unit 160.

In some embodiments, distributed security monitoring system 100 includes one or more worker units 160 (e.g., worker unit (1) and worker unit (N)) that are positioned to monitor individuals in a space. The worker units 160 can be positioned to monitor overlapping areas of the space. Alternatively, the worker units 160 can be positioned to monitor spaces isolated from one another. A management server, such as, for example, the master 102, includes a biometrics manager 126. The biometrics manager 126 is configured to receive characteristic data from the one or more worker units 160.

The characteristic data identifies at least a location and monitoring focus of a worker unit 160. The location of the worker unit 160 can be expressed as geographical coordinates (e.g., longitude, latitude, elevation, and orientation with respect to magnetic North), thus providing an absolute position of the worker unit 160. Alternatively, the location of the worker unit 160 can be expressed as a relative position (e.g., facing entrance, conference room 1, etc.). While expressing location of a worker unit 160 using relative position can be less precise, the relative position can be more relevant and understandable to a security officer, especially when the worker units 160 are located within a building or other well defined area, such as a park, or street intersections, for example.

The monitoring focus can include an identifier indicating whether the monitored space is a public area or a restricted area. In a restricted area, only authorized individuals are permitted to enter, thus a monitoring focus on a restricted, or secured area can be used generate a watchlist customized to include individuals authorized to be in the secured area. Since in a public space all individuals are by default permitted to enter, a monitoring focus on a public space can be used to generate a customized watchlist that includes individuals that are not permitted to be in the area, such as a criminal or the like. Additionally, the monitoring focus of the worker unit 160, determines whether persons of interest are individuals listed in the watchlist (e.g., public space focus) or the persons of interest are individuals excluded from the watchlist (e.g., secured space focus).

Based on the received characteristic data, the biometric manager 126 can be configured to select biometrics data associated with individuals that satisfy the monitoring focus criteria and location of the worker unit 160 from the biometrics database 128. Additionally, the biometric manager 126 can be configured to generate a customized watchlist for each worker unit 160 that includes the selected biometrics data, and transmit the customized watchlist to the appropriate worker unit 160. Also, the biometric manager 126 can be configured to update each worker unit 160 whenever changes are made to the biometrics database 128 that affect the content of the customized watchlists. In some embodiments, the master unit 102 can initiate transmission of watchlist updates to the appropriate worker units 160 when changes are made to the biometrics database 128. In other embodiments, the worker units 160 periodically transmit update requests to the master unit 102, which can transmit any watchlist updates in response. Having the worker units 160 initiate updates by transmitting update requests to the master unit 102 can provide a robust watchlist updating system even when network addresses are dynamically assigned to the worker units 160, and/or when network connectivity between the master unit 102 and the worker units 160 is intermittent.

The alerts manager 122, in some embodiment, can be configured to receive facial recognition data from the one or more worker units 160. The facial recognition data can identify at least one person of interest with a match confidence value based on the customized watchlists transmitted to the respective worker units 160. The alerts manager 122 can also issue an alert in response to at least one match confidence value exceeding a threshold value. The adjustment to the threshold value allows modification of the sensitivity of the monitoring system.

In cases where each individual worker unit 160 is unable to match an individual (person of interest) to a match confidence exceeding the threshold value, the alerts manager 122 can calculate a combined match confidence value of the person of interest identified by each of the respective worker units 160 using the biometric data associated with the individual. Since each worker unit 160 can provide a different angle, or perspective, of the individual, the combined facial recognition data from the plurality of worker units 160 can include more facial features for matching against the biometric data in the biometrics database 128 than any one worker unit 160 can provide, thus increasing the overall match confidence. The combined match confidence value can be calculated using multiple facial recognition data of the same person of interest provided by different worker units 160 within a predetermined time interval. Subsequently, the alerts manager 122 can issue an alert in response to the combined match confidence value exceeding the threshold value. In some embodiments, the combined match confidence value can be calculated using multiple facial recognition data received from the same worker unit 160. Each facial recognition data can include data from different image frames such that the person of interest is recorded from different angles in each image frame, as may occur, for example when the person of interest is turning.

When the combined match confidence value is calculated using multiple facial recognition data from the same worker unit 160, the combined match confidence value can be calculated by the worker unit 160. In this case, the combined match confidence value can be transmitted to the master unit 102 as a match confidence value. The facial recognition data transmitted to the master unit 102 can include the image frames used to calculate the combined match confidence value.

In some embodiments the application instances deployed by the master unit 102 are marked as "uniqueSiteWide", where instances are implemented as single instances deployed site-wide and reused by each of the worker application instances. Thus, in these embodiments, multiple instances of the face annotation unit 176, the face matching unit 178 and the face detection unit 180 (for each worker unit 160) interact with a single instance of each of the alerts manager 122, the alerts modifier 124 and the biometrics manager 126 deployed by the master unit 102. In this way, the resource needs of the master unit 102 remain unchanged regardless of the number of worker units 160 installed in the system 100. Moreover, since each worker unit 160 manages video feeds from dedicated imaging systems 172, the system 100 can be scaled to include any number of video feeds by installing additional worker units 160, thus, the resource needs for each worker unit remains unchanged as well.

Figure 2:
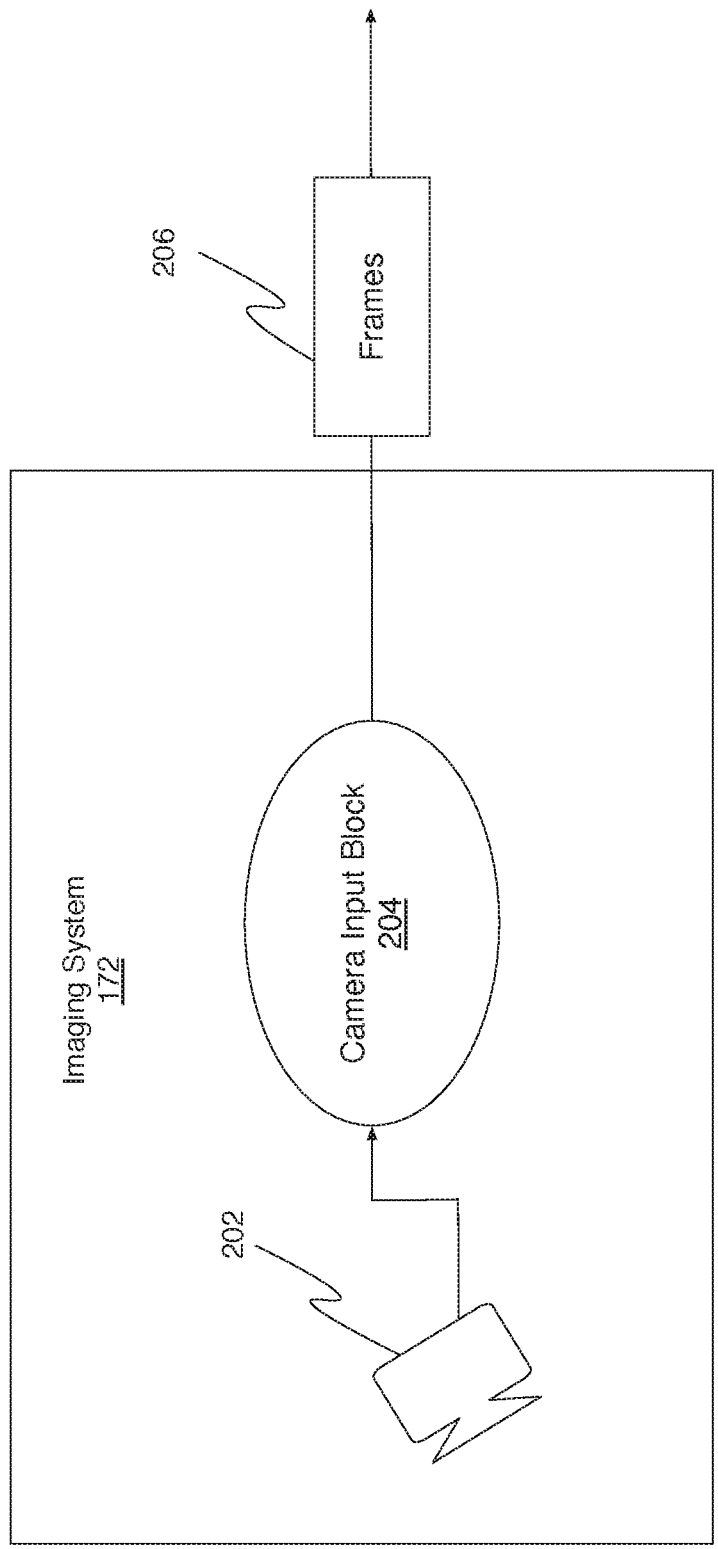
FIG. 2 is a block representation of an imaging system, in accordance with an embodiment of the present invention.

Within the usecase topology, illustrated in FIGS. 2-7, each imaging system 172 includes a camera 202 or other imaging sensor, and a camera input block 204, that segments the video stream from the camera and outputs frames 206, as shown in FIG. 2.

Figure 3:
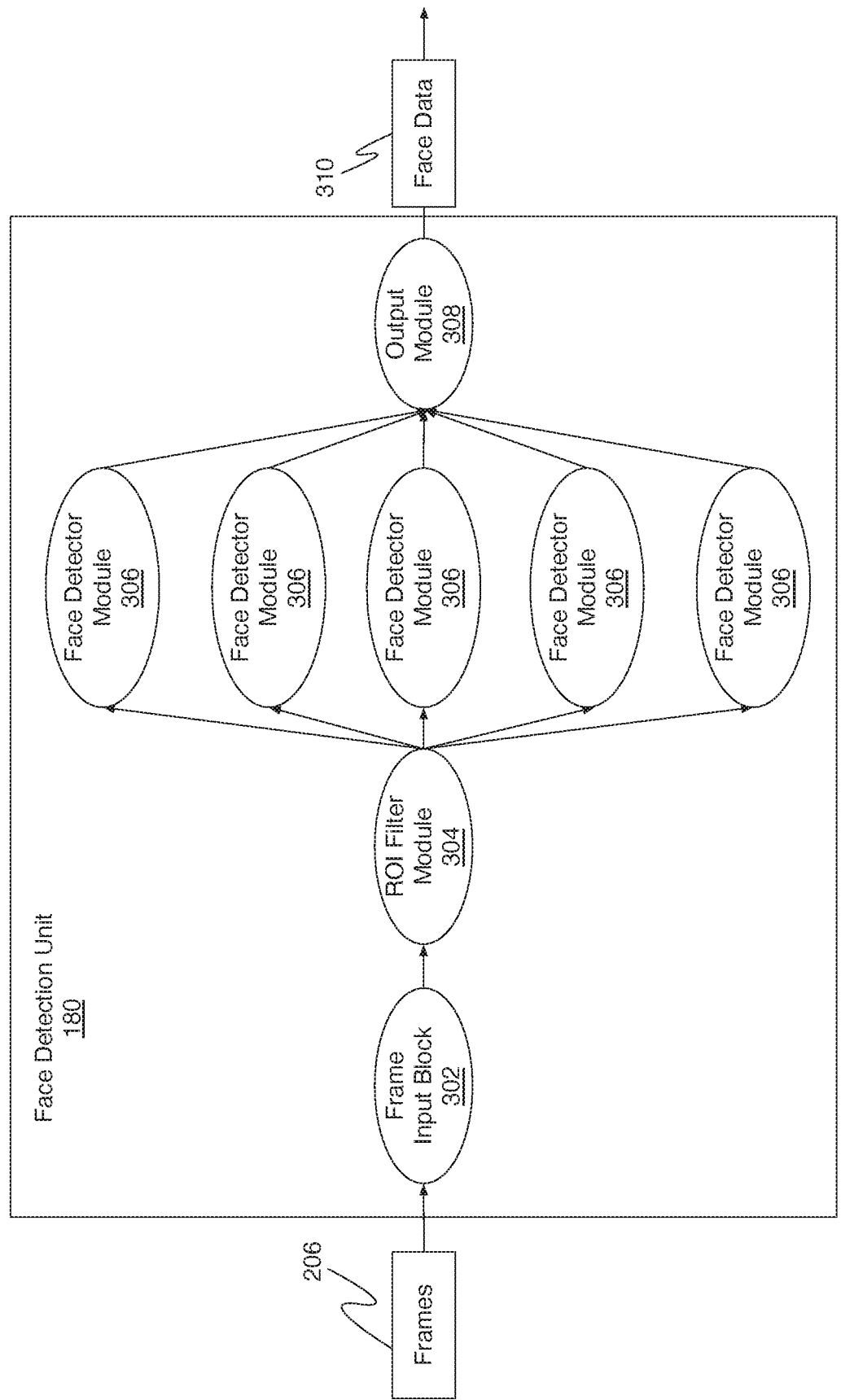
FIG. 3 is a block representation of a face detection unit, in accordance with an embodiment of the present invention.

Referring to FIG. 3, the frames 206 from the camera input block 204 are provided to a frame input block 302 of the face detection unit 180. A region of interest (ROI) filter module 304 receives frames from the frame input block 302, and filters regions of interest within the frame. Unwanted portions of the frame are discarded, and a transformed frame is generated that includes only the region of interests of the frame. The transformed frame is transmitted to face detector modules 306. The face detector module 306 can be deployed as multiple application instances executing in parallel. Each face detector module 306 receives a transformed frame from the ROI filter module 304. The face detector module 306 detects faces in the received transformed frame and extracts facial features of the faces. The detected faces along with the corresponding facial features from all the face detector modules 306 are collected by an output module 308. The output module 308 publishes the collected data as detected face data 310 for further use by other modules.

Figure 4:
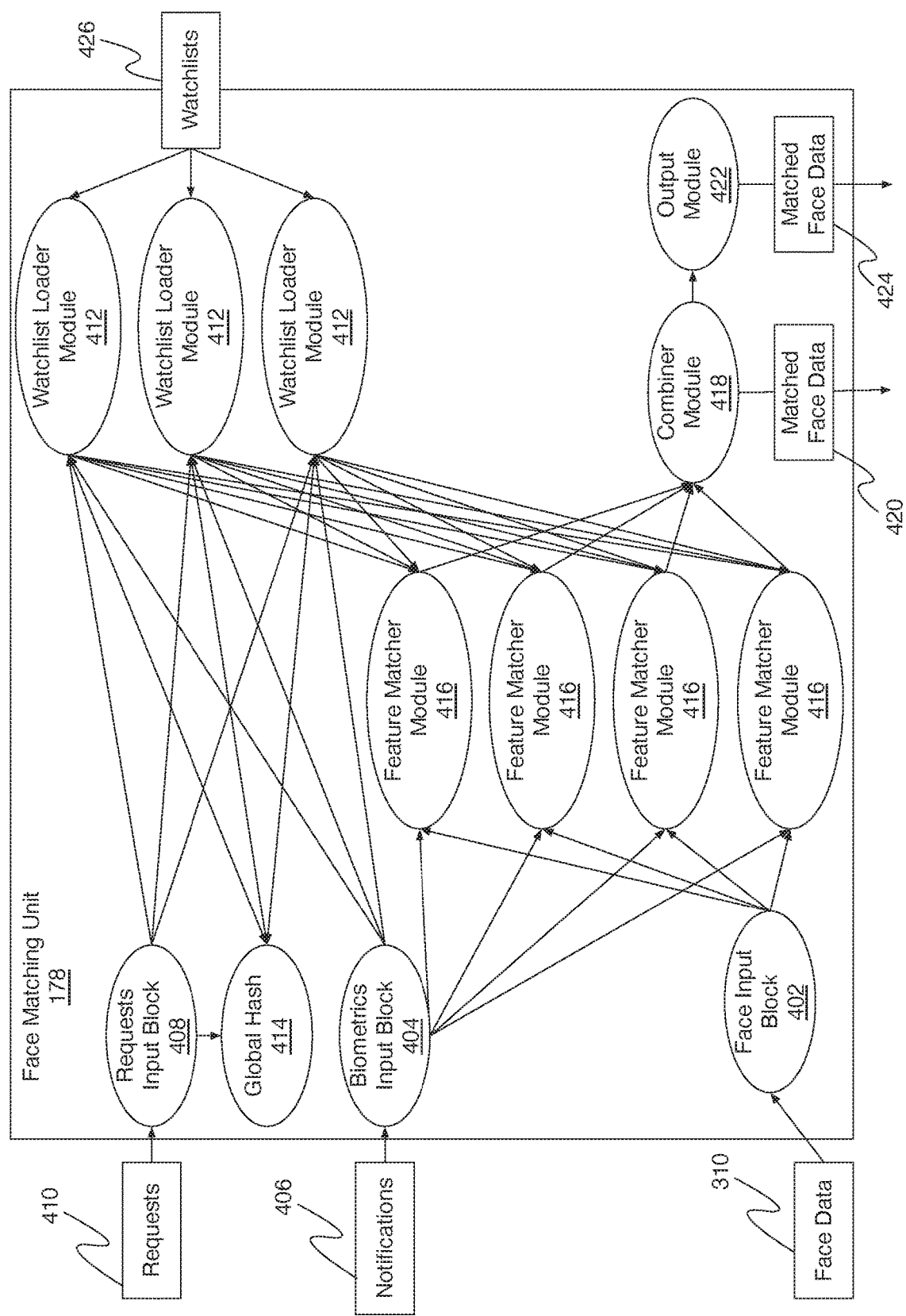
FIG. 4 is a block representation of a face matching unit, in accordance with an embodiment of the present invention.

Turning to FIG. 4, in an embodiment, face data is received by a face input block 402 of the face matching unit 178. Additionally, the face matching unit 178 includes a biometrics input block 404 configured to receive biometrics data 406 (e.g., watchlists) from the biometrics manager 126, and a requests input block 408 configured to receive requests 410 for querying loading status of watchlists and for actual loading of watchlists.

In some embodiments, the requests input block 408 can be implemented using, for example, representational state transfer (REST) application programming interfaces (API). If the request 410 is to load watchlists, then the requests input block 408 issues a loading request to instances of a watchlist loader module 412. If the request is for querying the loading status, then the requests input block 408 retrieves and outputs the loading status of the watchlists. The status of watchlist loading is maintained by the face matching unit 178 in a global hash table 414.

In some embodiments, the biometrics input block 404, upon system start-up, issues a watchlist loading request to watchlist loader module 412 instances. The biometrics input block 404 also connects to the biometrics manager 126, receives notifications 406 and issues notifications to feature matcher module 416 instances. These notification can include, e.g., making changes (e.g., add/update/remove) to a set of watchlists, making changes (e.g., add/update/remove) to individuals in a watchlist, turning a watchlist monitor ON or OFF, re-downloading a watchlist, and synchronizing watchlist and worker unit status updates, etc.

As noted above, the watchlist loader module 412 can have multiple instances running in parallel to address watchlist loading requests. The watchlist loader module 412 instances can connect to the biometrics manager 126 to download watchlists 426 along with biometrics details in the watchlists 426. The biometrics details of each individual in the watchlists 426 can include facial features. The watchlist loader module transmits the biometrics details to feature matcher module 416 instances using a person identifier (ID), thus all updates for a particular individual can be passed to the same instance of the feature matcher module 416 that received the first update for the individual. The loading status of each watchlist 426 is updated by watchlist loader module 412 instances in the global hash table 414.

The feature matcher module 416 can have multiple instances running in parallel, with each instance loading a portion of a watchlist 426, including biometric details. Using the portion of the watchlist 426 loaded, each instance of the feature matcher module 416 analyzes a received face, and issues match results to a combiner module 418. Each of the feature matcher module 416 instances receive the same face for analysis, thus the analysis of the face can occur in parallel against the individuals in a watchlist, thereby reducing processing time for matching a face to a watchlisted individual.

The combiner module 418 receives partial match results from each of the feature matcher module 416 instances, and computes the best match result from the partial matches. If a facial match is found, the combiner module 418 transfers the facial match data 420 to the alerts modifier 124 and the output module 422 which, in turn, transmits the facial match data 424 to the face annotation unit 176. In some embodiments, a face match alert (in the form of a facial match data 420) is transmitted to the alerts modifier 124 each time a facial match of an individual is detected. In some embodiments, alerts for matched faces (facial match data 420) are sent to the alerts modifier 124 when the time difference between the current time and the time of a previously sent alert (facial match data 420) for the same individual exceeds a specified time interval. In other embodiments, alerts for matched faces (facial match data 420) are sent to the alerts modifier 124 if the current match score is greater than a previous match score and a predefined delta change.

Figure 5:
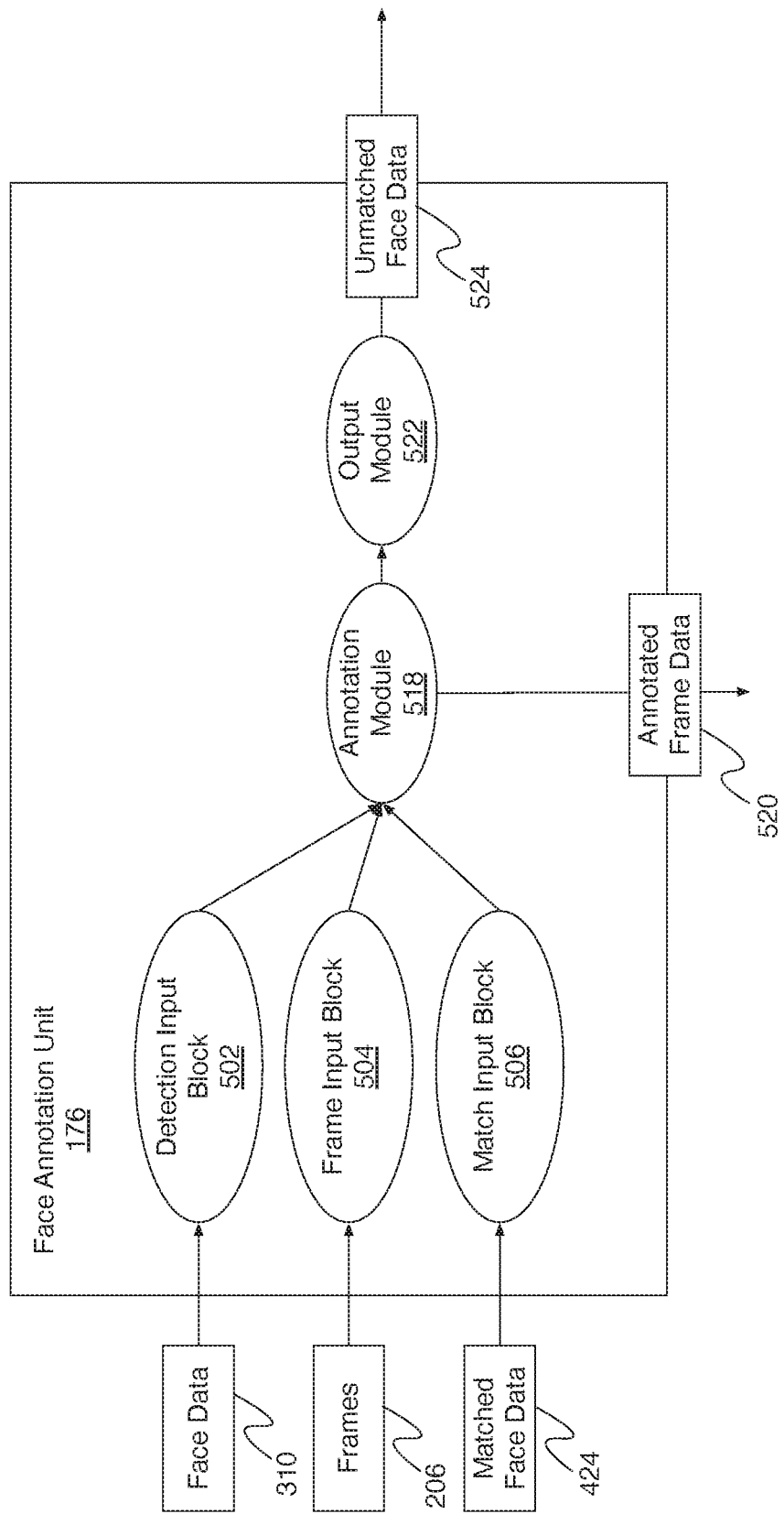
FIG. 5 is a block representation of a face annotation unit, in accordance with an embodiment of the present invention.

FIG. 5 illustrates an embodiment of a face annotation unit 176. The face annotation unit 176 receives facial match data 424 from the output module 422 of the face matching unit 178. The facial match data 424 includes image frames, detected faces and matched faces from which the face annotation unit 176 generates annotated frames 520 as an output of an annotation module 518. Additionally, the face annotation unit 176 transmits alerts for people who are not in the watchlist (unmatched face data 524).

In some embodiments, the face annotation unit 176 includes a frame input block 504 that is configured to receive video frames 206 from the camera input block 204 shown in FIG. 2. The frame input block 504 transmits the video frames 206 to an annotation module 518. Also, a detection input block 502 receives detected face data 310 from the face detection unit 180, which are transmitted to the annotation module 518 as well. Additionally, a match input block 506 receives facial match data 424 from the face matching unit 178, which are transmitted to the annotation module 518.

In some embodiments, the annotation module 518 combines the data received from the frame input block 504, detection input block 502, and match input block 506, which are subsequently rendered and published as annotated frames 520. Further, the annotation module 518 sends faces that do not match individuals in the watchlist to an output module 522. The output module 522 of the face annotation unit 176 receives faces of individuals that are not listed on the watchlist. The output module 522 sends the unmatched faces (unmatched face data 524) to the alerts manager 122.

Figure 6:
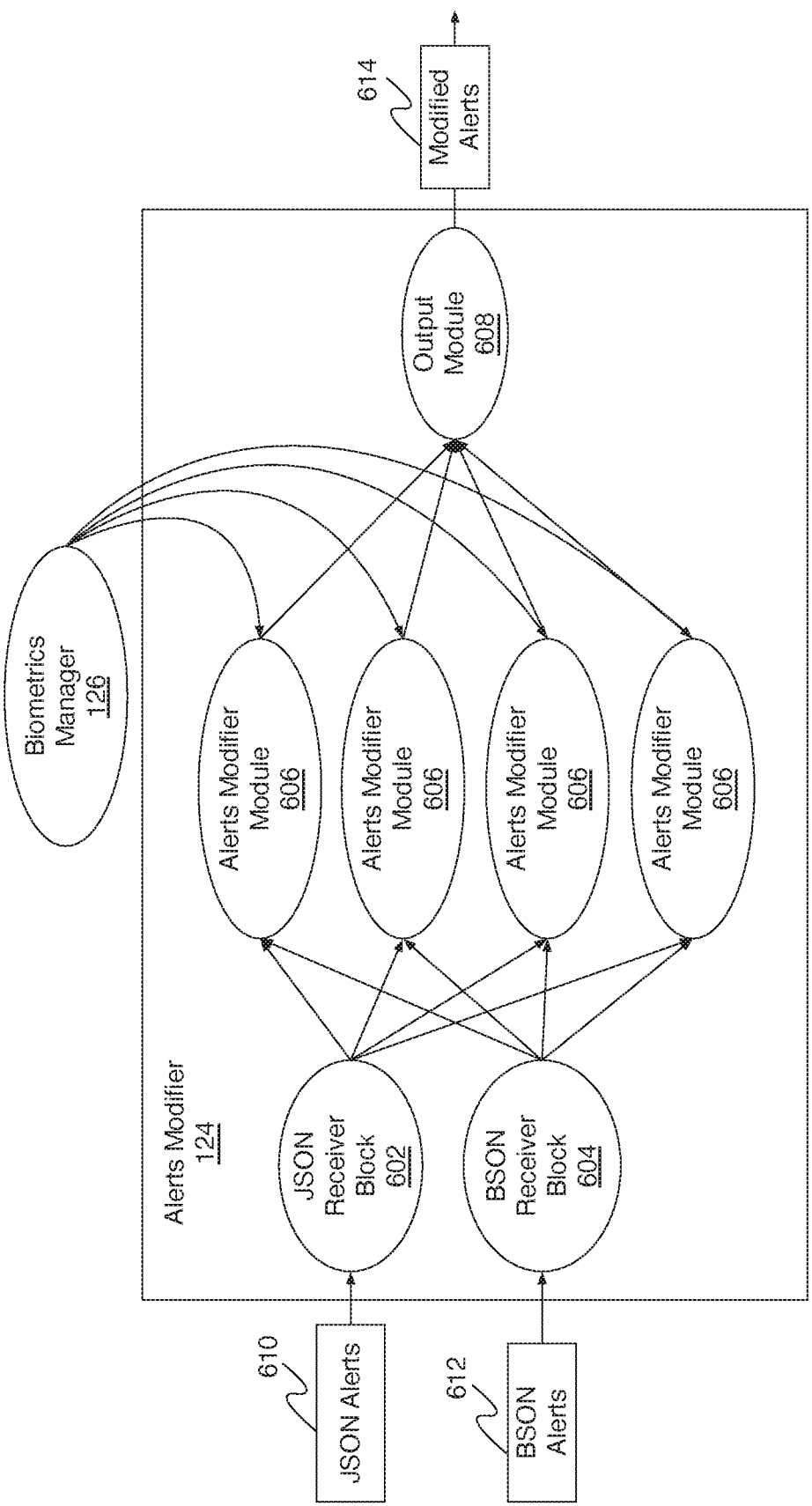
FIG. 6 is a block representation of an alerts modifier, in accordance with an embodiment of the present invention.

FIG. 6 illustrates an embodiment of the alerts modifier 124 of the master unit 102 (shown in FIG. 1). The alerts modifier 124 receives alerts, modifies the alerts and sends them to the alerts manager 122. The alerts modifier 124 can include a JavaScript™ object notation (JSON) receiver block 602, a BSON (binary JSON) receiver block 604, an alerts modifier module 606 and an output module 608. The JSON receiver block 602 receives alerts in JSON format 610 and transmits those alerts to instances of the alerts modifier module 606. Similarly, the BSON receiver block 604 receives alerts in BSON format 612 and transmits those alerts to instances of the alerts modifier module 606.

The alerts modifier module 606 can implement multiple instances. Each instance receives each alert from the JSON receiver block 602 and the BSON receiver block 604. Additionally, the alerts modifier module 606 retrieves an enrolled image of an individual from the biometrics manager 126. The alerts modifier module 606 modifies the alert by attaching the enrolled image and sends the modified alert to the output module 608. The output module 608 receives the modified alert from alerts modifier module 606 and transmits the modified alert 614 received from the alerts modifier module 606 to the alerts manager 122.

Figure 7:
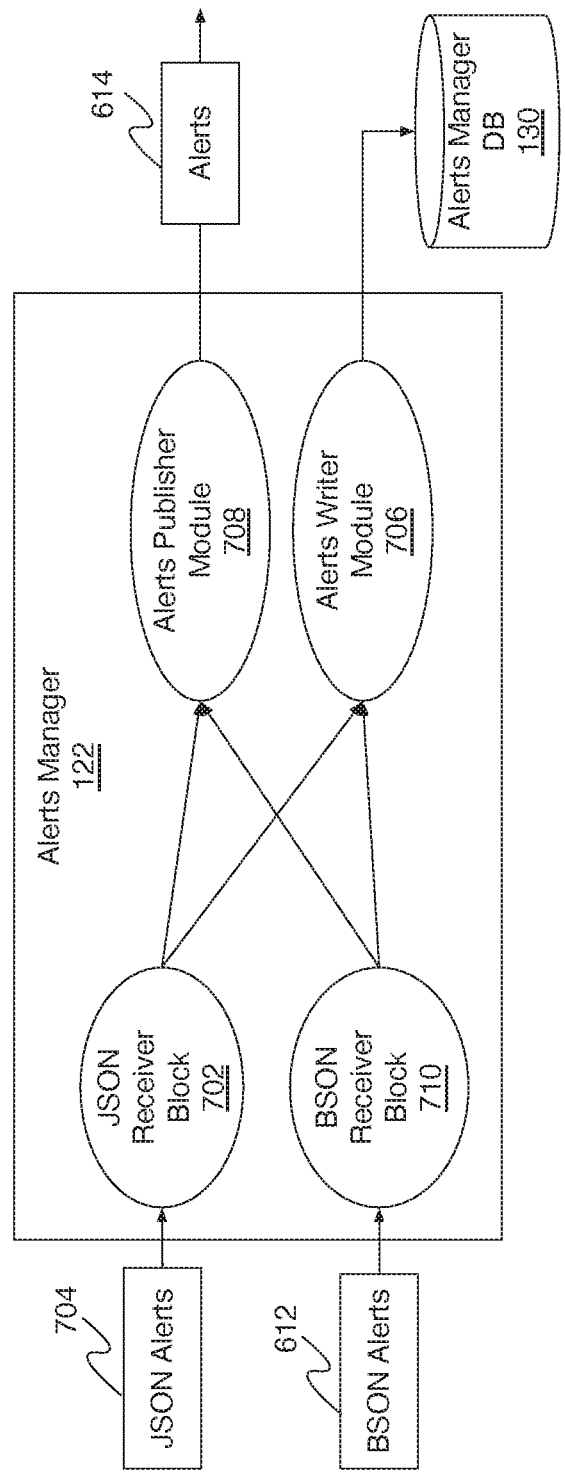
FIG. 7 is a block representation of an alerts manager, in accordance with an embodiment of the present invention.

FIG. 7 illustrates an embodiment of an alerts manager 122 of the master unit 102 (shown in FIG. 1). The alerts manager 122 can include a JSON receiver block 702 that receives JSON formatted alerts 704 and transmits them to an alerts writer module 706 and an alerts publisher module 708. Similarly, the alerts manager 122 can include a BSON receiver block 710 that receives BSON formatted alerts 712 and transmits them to the alerts writer module 706 and the alerts publisher module 708. The alerts writer module 706 writes alerts received from the JSON receiver block 702 and the BSON receiver block 710 into the alerts manager database 130. In some embodiments, block 702 and block 710 can combine multiple facial recognition data of the same person of interest when the match confidence value provided by different worker units 160 within a predetermined time interval is below the threshold value, and calculate a combined match confidence value that exceeds the threshold value. The alerts manager 122 can calculate a combined match confidence value, and issue an alert in response to the combined matched confidence exceeding the threshold value.

In some embodiments, the combined match confidence value is calculated by identifying a plurality of facial recognition data that include the same person of interest for which the match confidence value is below the match confidence threshold. The plurality of facial recognition data can originate from the same worker unit, different worker units or a combination thereof. The facial features of the person of interest are extracted from the plurality of facial recognition data. Once extracted, the facial features are combined to generate a new facial feature of the person of interest. This new facial feature is matched to biometrics data stored in the biometrics database 128 to obtain a combined match confidence. In some embodiments, the process for performing the matching is similar to the process implemented by the face matching unit 178 (shown in FIG. 4) and face annotation unit 176 (shown in FIG. 5). However, rather than having a worker unit 160, execute the combined facial feature matching process, the process can be performed by the master unit 102.

In some embodiments, the alerts manager database 130 stores all alerts for a specified period of time. In other embodiments alerts are stored in the alerts manager database 130 until a system operator removes the alerts. The alerts publisher module 708 receives alerts from the JSON receiver block 702 and the BSON receiver block 710 and publishes the alerts 614 in a manner facilitating usage by other applications and/or third parties.

Figure 8:
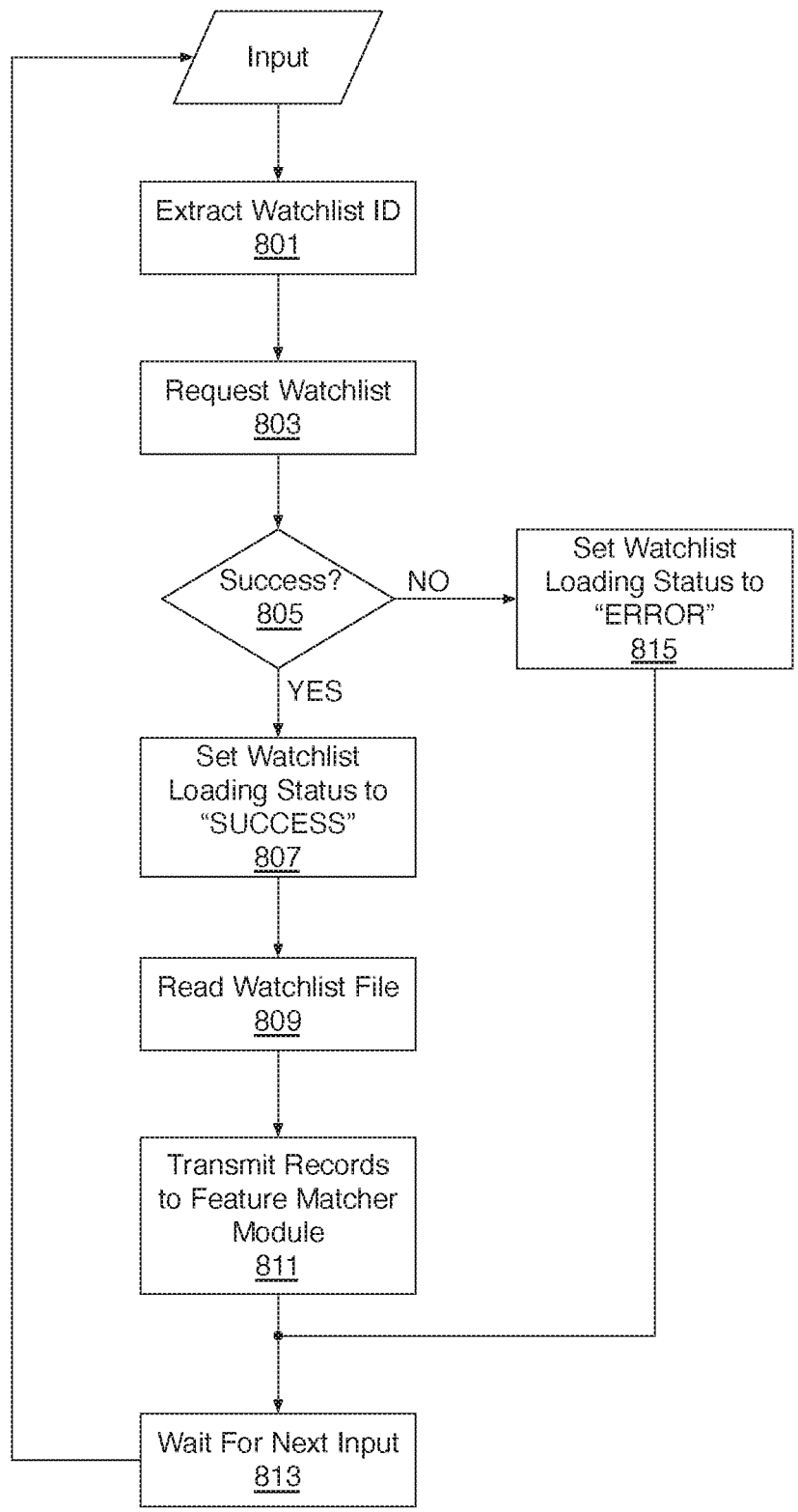
FIG. 8 is a flow diagram illustrating an operational process executed by a watchlist loader module, in accordance with an embodiment of the present invention.

FIG. 8 illustrates a flowchart of an operational process executed by an embodiment of watchlist loader module 412 shown in FIG. 4. In some embodiments, multiple instances of the watchlist loader module 412 can be implemented, with each instance of the watchlist loader module 412 executing the operational process illustrated in FIG. 8. Upon receiving an input from the requests input block 408 or the biometrics input block 404 shown in FIG. 4, the watchlist loader module 412, at block 801, extracts the watchlist identifier (watchlist ID) from the input. At block 803, the watchlist loader module 412 requests that a watchlist data file corresponding to the watchlist ID be downloaded from the biometrics manager 126 of the master unit 102 shown in FIG. 1. The watchlist loader module 412 determines, at block 805, whether the requested watchlist download was successful or not. An unsuccessful download attempt causes the process to continue to block 815, where a watchlist loading status is set to "error". From block 815, the process continues to block 813 where the watchlist loader module 412 waits for receipt of a next input.

On the other hand, a successful download attempt causes the process to proceed from block 805 to 807, where the watchlist loading status is set to "success". The watchlist loader module 412 proceeds to block 809 and reads the watchlist file. The records in the watchlist file are transmitted, at block 811, to a feature matching module 416, such as, for example, the feature matching module 416 shown in FIG. 4. The watchlist loader module 412, upon completing transmission of the records in block 811, proceeds to block 813 and waits for a new input.

Figure 9:
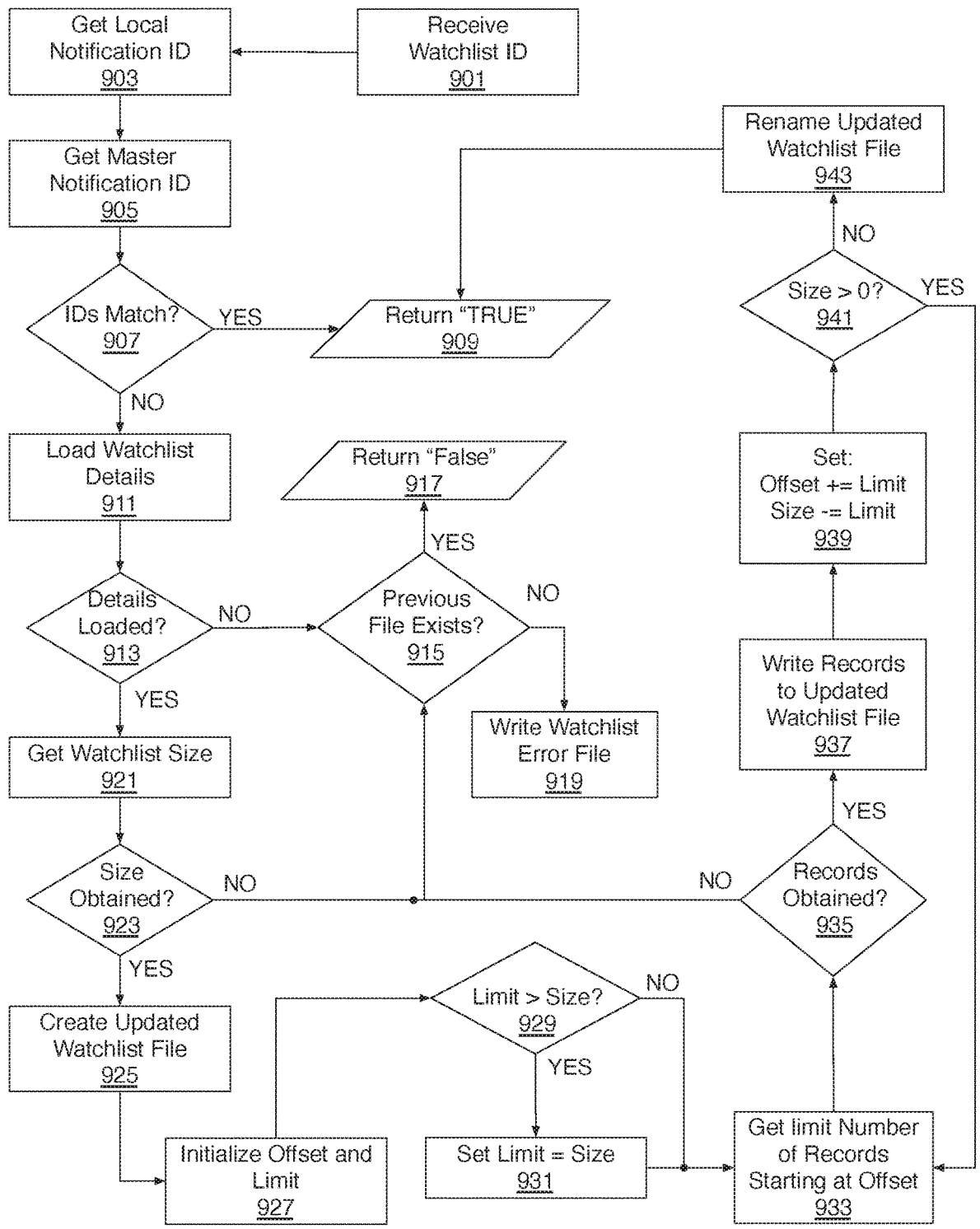
FIG. 9 is a flow diagram illustrating a watchlist download process executed by a watchlist loader module, in accordance with an embodiment of the present invention.

FIG. 9 illustrates a watchlist download process executed by instances of the watchlist loader module 412 in some embodiments. The watchlist loader module 412 begins the download process at block 901 by receiving a watchlist ID of a requested watchlist. The watchlist loader module 412, at block 903, extracts a local notification ID from a local copy of the watchlist associated with the watchlist ID if the local copy of the watchlist exists. If the local copy does not exist, the local notification ID is set to a default value, such as, for example, −1, signifying that no local copy exists. This local notification ID is the latest notification ID for the watchlist that was previously downloaded. After obtaining the local notification ID at block 903, the latest notification ID for the watchlist is obtained from biometrics manager 126 at block 905. The latest notification ID from the biometrics manager 126 is referenced hereinafter as a master notification ID.

At block 907, the local notification ID and the master notification ID are compared and matched. If the local notification ID and the master notification ID match at block 907, then there is no need to download another copy of the watchlist, as the current local copy is the latest version of the watchlist. Thus, the watchlist loader module 412 proceeds to block 909, where a "true" signal, signifying successful completion of the download process, is issued.

However, in cases where the local notification ID and the master notification ID do not match at block 907, the watchlist loader module 412 proceeds to block 911. At block 911, watchlist details are downloaded from the biometrics manager 126. In some embodiments, the watchlist details can include watchlist name, priority or threat level, and any other metadata associated with the watchlist. Alerts issued by the system 100 can include the priority or threat level of the watchlist in which the person of interest is found.

A check is performed, at block 913, to determine whether download of the watchlist details was successfully. If the download of the watchlist details was unsuccessful, the process continues to block 915, where the watchlist loader module 412 checks if a copy of any previous version of the watchlist exists. If a previous watchlist file version exists, the process returns a "false" signal at block 917. The "false" signal indicates that the download process did not complete successfully, and thus, the watchlist version that was previously downloaded will be used. If a previous watchlist file version does not exist, the watchlist loader module 412 generates an error file including the watchlist ID at block 919. The process continues to block 917 and returns a "false" signal indicating that the download process did not complete successfully. The presence of the error file signifies that download of the watchlist failed and needs to be re-tried later.

If the watchlist details are loaded successfully, the process continues from block 913 to block 921. At block 921, the watchlist size is obtained from the biometrics manager 126. The watchlist size is the total number of individuals registered in the watchlist.

The watchlist loader module 412 instance checks if the size was obtained successfully or not. If the size is not successfully obtained, the process proceeds to block 915 and continues as described above. However, if the size is obtained successfully, then a temporary updated watchlist file is created at block 925. The temporary updated watchlist filename can include, in some embodiments, a watchlist ID and ending with an ".updated" extension. Other filename naming formats can be used as well. Additionally, the temporary updated watchlist file can include the master notification ID, therein. At block 927, the watchlist loader module 412 initializes an "offset" variable and a "limit" variable. For example, the "offset" variable can be set to a value of 0, and the "limit" variable can be set to a value of 20. A check is performed at block 929, checking if "limit" is greater than the watchlist size. If "limit" is greater than the watchlist size, the watchlist size is assigned to "limit" at block 931. The process then continues to block 933. However, if "limit" is not greater than the watchlist size, the process proceeds directly from block 929 to block 933, skipping over block 931.

The watchlist loader module 412 retrieves "limit" number of records from the biometrics manager 126 starting at the current "offset" at block 933. The watchlist loader module 412 verifies, at block 935, that the records are successfully retrieved at block 933. If the records are not successfully retrieved at block 933, the watchlist loader module 412 instance proceeds to block 915 and continues as described above. If the records are successfully retrieved, then the records are written in the temporary updated watchlist file at block 937.

Once a batch of records is successfully obtained at block 933 and written to the temporary updated watchlist file at block 937, the "offset" is increase by "limit" and the "size" is reduced by "limit" at block 939. A check is performed at block 941 to verify that "size" is greater than 0, signifying that additional records still remain to be written to the temporary updated watchlist file. If the "size" is not greater than 0, the process renames the temporary updated watchlist file at block 943 by removing the ".updated" extension from the filename, leaving the watchlist ID as the filename. In other embodiments the temporary updated watchlist file can be renamed using a predefined naming format, such as, for example, replacing ".updated" with a date code. The watchlist loader module continues from block 943 to block 909 and ends.

However, if the "size" is greater than 0, signifying that more records exist to download, the process returns to block 933 where the new "offset" and "size" values are used to retrieve additional records, and continues as described above. The loop from block 933 to block 941 continues until all the records in the watchlist are successfully downloaded from the biometrics manager 126.

Figure 10:
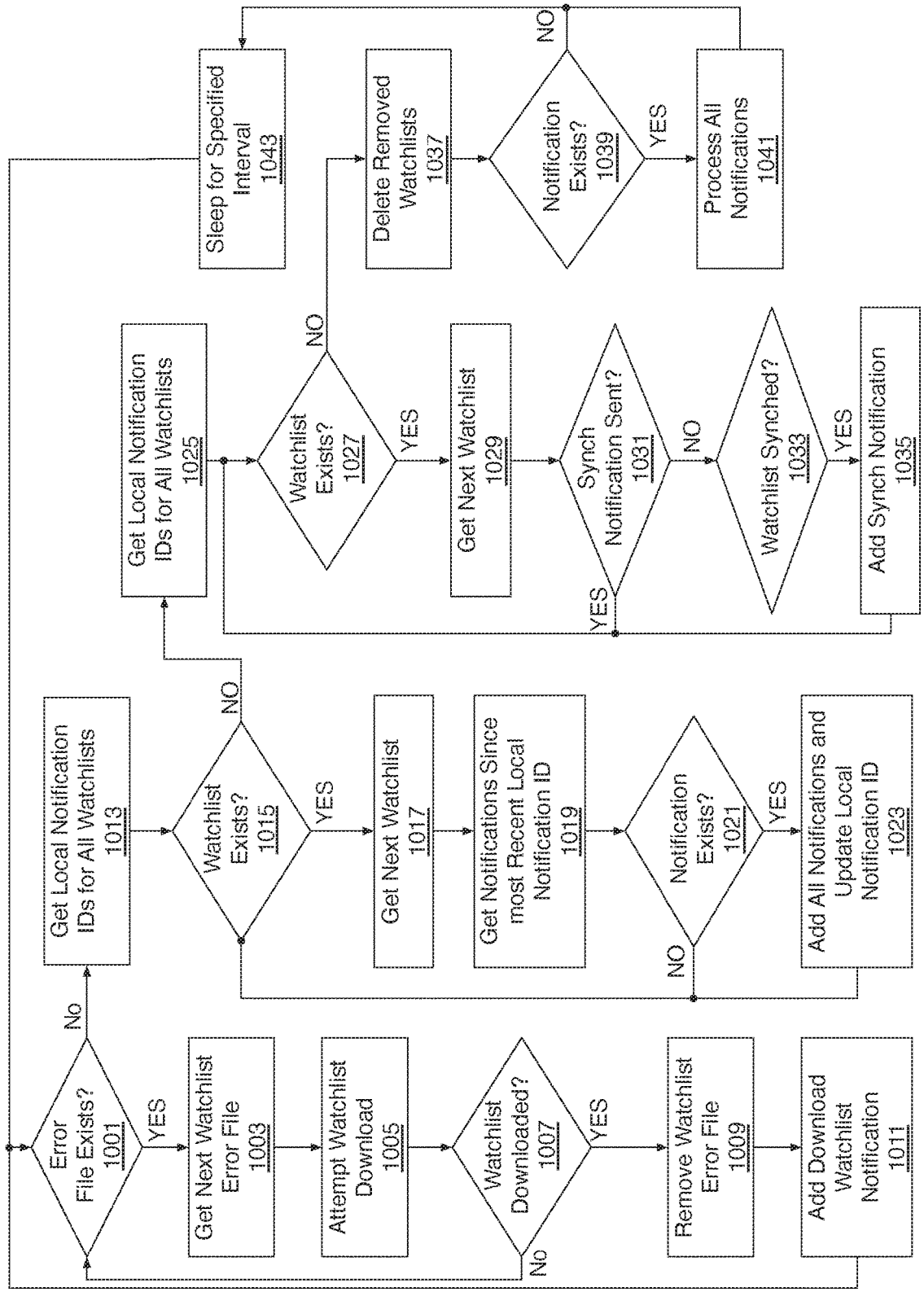
FIG. 10 is a flow diagram illustrating a notifications retrieval process executed by a biometrics input block, in accordance with an embodiment of the present invention.

FIG. 10 illustrates a procedure followed by an embodiment of the biometrics input block 404 (shown in FIG. 4) to retrieve notification(s) from the biometrics manager 126 (shown in FIG. 1).

In some embodiments, the biometrics input block 404 checks if any watchlist error files exist at block 1001. If yes, the watchlist error file is obtained at block 1003. The biometrics input block 404 attempts, in block 1005, to download the watchlist identified in the watchlist error file using the procedure described in FIG. 9, above. The biometrics input block 404 confirms at block 1007 that the watchlist is successfully downloaded. If the watchlist is successfully downloaded, the error file is removed at block 1009. Additionally, the biometrics input block 404, upon successful download of the watchlist, can issue a downloaded notification for the watchlist at block 1011. The process returns to block 1001 to begin the procedure again with a next watchlist error file. If the watchlist is not downloaded successfully, process returns to block 1001 to begin the procedure again with a next watchlist error file, until no more watchlist error files exist.

Once the biometrics input block 404 has processed all the watchlist error files, signified by block 1001 not finding any additional watchlist error files, the process proceeds to block 1013. At block 1013, the biometrics input block 404 obtains local notification IDs for all watchlists. The biometrics input block 404 iteratively performs block 1015 through block 1023, for each of the watchlists. At block 1015 the biometrics input block 404 confirms that a watchlist corresponding to the current local notification ID exists. The next watchlist is accessed at block 1017. Any notifications associated with the current watchlist received from the biometrics manager 126 since the most recent local notification ID are obtained at block 1019. If no notifications exist for the watchlist, as determined at block 1021, the process returns to block 1015, otherwise the process continues to block 1023. These new notifications are added to the local notifications and the local notification ID is updated, at block 1023, to the most recent notification ID. These notifications are related to addition, update or removal of a watchlist or individual. Upon completion of block 1023, the process returns to block 1015.

Once the notifications for the existing watchlists are added, the biometrics input block 404 proceeds from block 1015 to block 1025, where the current local notification IDs for the watchlists are retrieved. The biometrics input block 404 iteratively performs block 1027 through block 1035 for each of the watchlists. At block 1027, a check is performed to determine if a watchlist exists to be processed. If the check finds that additional watchlists exist, biometrics input block 404 gets the next watchlist at block 1029. The biometrics input block 404 checks, at block 1031 if a "synch" notification was sent for the watchlist. If a "synch"

notification was sent, then the process returns to block 1027 and the next watchlist is checked. If a "synch" notification was not sent, the biometrics input block 404 checks, at block 1033, if the watchlist is in synch with the watchlist version held by the biometrics manager 126 (e.g., the master watchlist). If the local notification ID and the most recent notification on the master watchlist obtained from the biometrics manager 126 are the same, then a "synchronized" Watchlist notification is added at block 1035. The process returns to block 1027 to process the next watchlist. When no more watchlists remain to be processed, the biometrics input block 404 proceeds to block 1037 where the watchlist files of deleted watchlists are removed. The biometrics input block 404 checks, at block 1039, if any notifications have been added during the process shown in FIG. 10, namely at block 1011, block 1023 and block 1035. If notifications exist, the biometrics input block 404 processes the notifications at block 1041 one by one by forwarding each notification to the feature matcher module 416 or the watchlist loader module 412, or processing the notification locally, as appropriate. Notifications to "download" a watchlist are sent to instances of the watchlist loader module 412, while all other notifications, except notifications for "synchronized" watchlists, are sent to instances of the feature matcher module 416. Notifications for "synchronized" watchlist is locally processed by the biometrics input block 404, and the loading status of the watchlist is updated to "success" in the global hash table 414.

If, at block 1039, no notifications exist or after processing all notifications at block 1041, the biometrics input block 404 sleeps for a specified time interval and then jumps to block 1001 and continues to obtain and process notifications from the biometrics manager 126.

Figure 11:
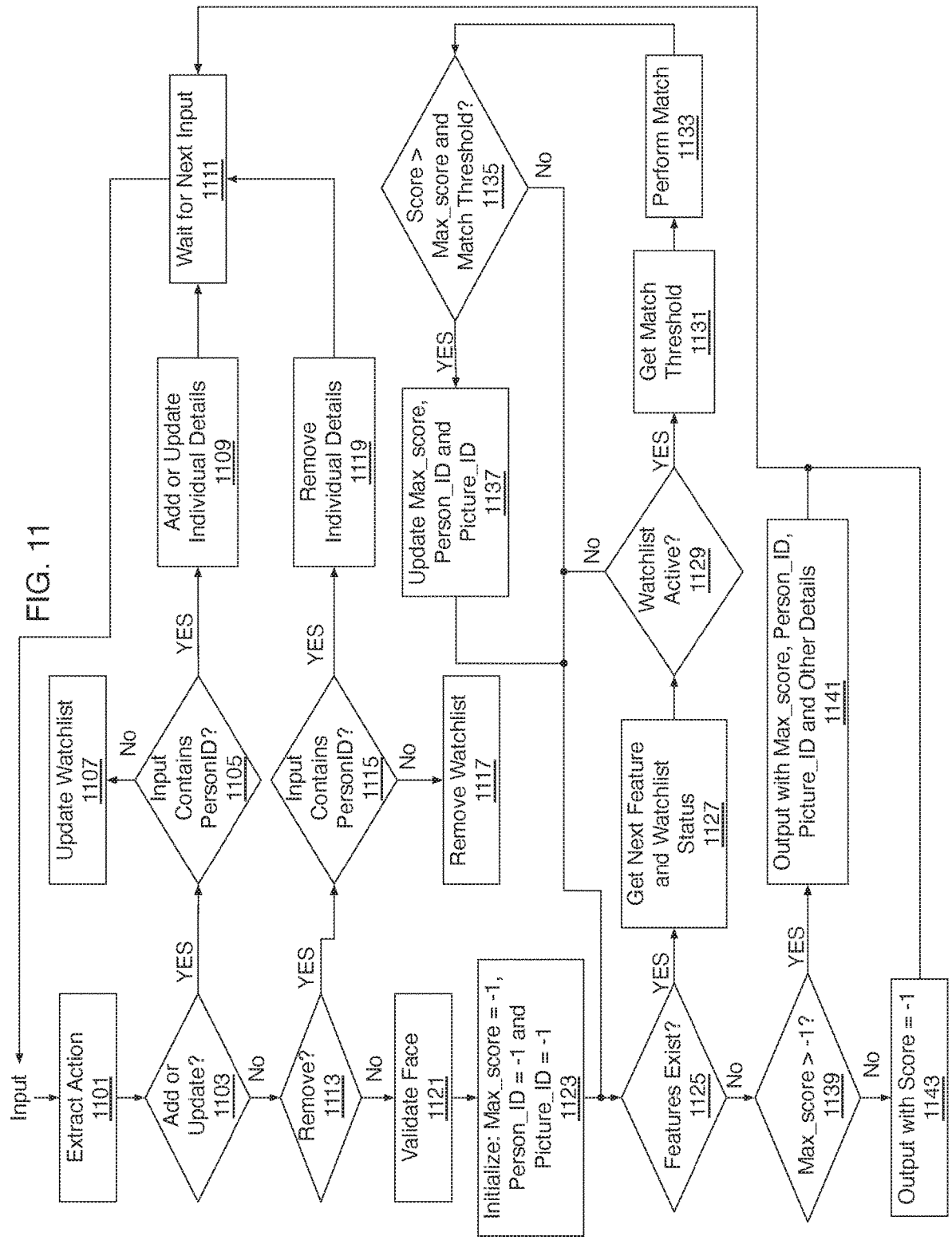
FIG. 11 is a flow diagram illustrating operational process executed by a feature matcher module, in accordance with an embodiment of the present invention.

Turning to FIG. 11, an operational process of an embodiment of the feature matcher module 416 is shown. Upon receiving an input from any of the biometrics input block 404, the face input block 402 and the watchlist loader module 412, the feature matcher module 416 extracts any actions in the input at block 1101. An instance of the feature matcher module 416 checks the extracted actions at block 1103 to determine whether the actions are for an update or an addition to the watchlists. If the action is an update or addition action, the process continues to block 1105. At block 1105, the feature matcher module 416 determines if the action includes a Person_ID, which identifies an individual in the watchlist. If the action does not include a Person_ID, the feature matcher module 416 updates the watchlist details at block 1107. However, if the action includes a Person_ID the feature matcher module 416 updates or adds an individual identified by the Person_ID at block 1109. Once the action is completed the process continues to block 1111 where the feature matcher module 416 waits for the next input.

Returning to block 1103, if the feature matcher module 416 determines that the action is neither an update nor an addition action, the feature matcher module 416 continues to block 1113. At block 1113, the process determines if the action is a removal action. If the action is a removal action, the feature matcher module 416 determines if the action also includes a Person_ID at block 1115. If the action does not include a Person_ID, the feature matcher module 416 removes the watchlist details at block 1117. However, if the action includes a Person_ID the feature matcher module 416 removes the individual identified by the Person_ID at block 1119. Once the action is completed the process continues to block 1111 where the feature matcher module 416 waits for the next input.

Returning to Block 1113, the feature matcher module 416, if the action is not a removal action, then the input contains a face to match. The feature matcher module 416 validates the face at block 1121. At block 1123, the feature matcher module 416 initializes a Max_score variable to −1, a Person_ID variable to −1 and a Picture_ID variable to −1. The process determines if facial features for matching exist at block 1125. If features to match exist, the process obtains a next feature along with the face's watchlist status at block 1127. The watchlist is checked to determine if the watchlist status is set to "active" in block 1129. If the watchlist is not active, the process returns to block 1125 and continues as described above.

However, if the watchlist is determined to be active at block 1129, a match threshold is obtained at block 1131. A facial match is performed between the current facial feature and facial data associated with the watchlist at block 1133. During the facial match at block 1133, a similarity score is generated reflecting the degree of similarity between the current facial feature and the facial data. A check is performed to determine if the similarity score is greater than Max_score, and if the similarity score is greater than the match threshold at block 1135. A similarity score less than Max_score and the match threshold causes the process to return to block 1125 and continue as described above.

If at block 1135, the similarity score is determined to be greater than the Max_score and the match threshold, the process proceeds to block 1137, where the Max_score, Person_ID and Picture_ID are updated. Once the Max_score, Person_ID and Picture_ID are updated, the process returns to block 1125. The Max_score is updated to reflect the similarity score. The loop between block 1125 and block 1137 continues until no more features exist to process. When block 1125 determines that no mor features exist, the process continues to block 1139. At block 1139, the process determines if the Max_score is greater than −1.

A Max_score greater than −1 signifies that a match has been found for the input face. Thus, the process continues to block 1141 where an output is generated that includes the Max_score along with the Person_ID, the Picture_ID and watchlist details. The output is transmitted to the combiner module 418. The process then returns to block 1111 to await a next input. However, a Max_score that is not greater than −1 signifies that a match has not been found for the input face. Thus, the process continues to block 1143 where an output is generated that includes the Max_score set to −1. The output is transmitted to the combiner module 418. The process then returns to block 1111 to await a next input.

Figure 12:
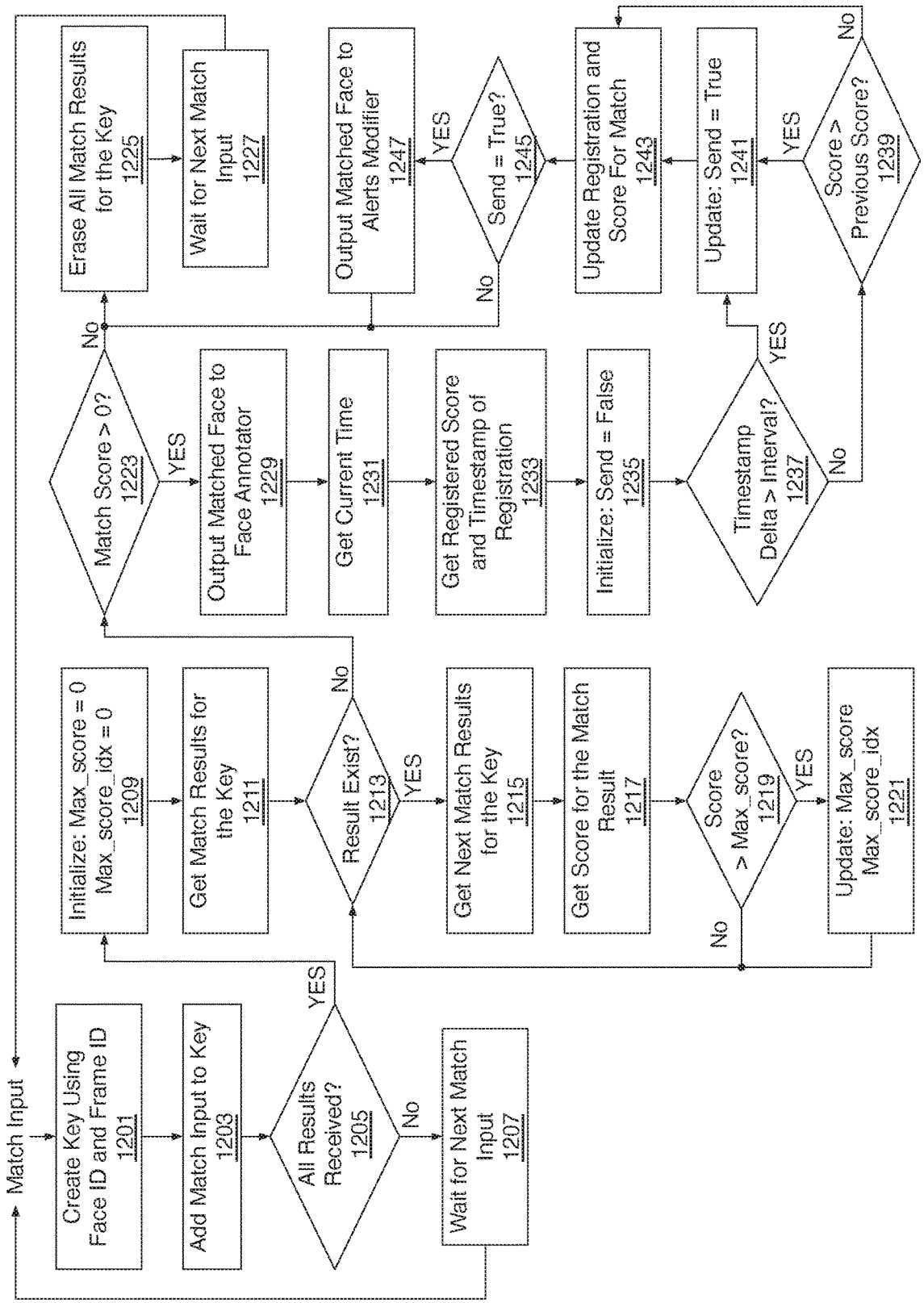
FIG. 12 is a flow diagram illustrating an operational process executed by a combiner module, in accordance with an embodiment of the present invention.

As described above, in some embodiments, an output from the feature matcher module 416 is transmitted to the combiner module 418. The output from block 1141 or block 1143 of the feature matcher module 416, as described with respect to FIG. 11 is received as a match input by the combiner module 418. In some embodiments, the match inputs are received from a plurality of instances of the feature matcher module 416. FIG. 12 illustrates an operational procedure for an embodiment of the combiner module 418 with respect to processing the received match inputs. The procedure begins, upon receiving a match input, at block 1201 where a key is created using a face ID and a frame ID associated with the match input. The face_ID and frame ID are generated by the face detection module 306 and the imaging system 172, respectively during the processing. Each frame can have one or more faces. Each of these faces is being processed in parallel on partial watchlist data by the feature matcher module 416. A key is created using face ID and frame ID for the combiner to know when all partial matches have been completed and received. For example, if there are two parallel feature matcher modules 416 then the combiner should receive two results for a key corresponding to that face ID and frame ID. The match input is mapped to the key at block 1203. The combiner module 418 checks if all results (e.g., all the match inputs from the various instances of the feature matcher module 416) have been received at block 1205. If the combiner module 418 has not received all the results, the procedure continues to block 1207 and waits for a next match input to be received, thus returning to block 1201.

However, once all the results have been received, the procedure continues from block 1205 to block 1209, where Max_score variable and the Max_score_idx variable are both initialized to zero. At block 1211, the combiner module 418 retrieves the match results using the key. At block 1213, the procedure checks if match results remain to be processed. As long as match results remain to be processed the procedure executes the processing loop from block 1213 through block 1221. Thus, at block 1215, the next match result is retrieved.

The combiner module 418 reads the Max_score included in the match result at block 1217. The Max_score included in the match result is the similarity score determined at block 1135 of FIG. 11 and output by block 1141. Thus, to avoid confusion with the Max_score initialized at block 1209, the Max_score included in the match result will be referred to as the similarity score hereinafter. If the similarity score is greater than the Max_score, as determined at block 1219, the procedure continues to block 1221. At block 1221, the Max_score is updated to reflect the similarity score and the Max_score_idx is updated with index of the current match result. The procedure returns to block 1213 to begin processing the next match result, if one exists. However, if the similarity score is not greater than the Max_score, as determined at block 1219, the procedure returns to block 1213 without updating the values of the Max_score and the Max_score_idx.

Once all the match results have been processed by the loop from block 1213 through block 1221, the procedure continues to block 1223. At block 1223, the Max_score is evaluated. If the Max_score is less than zero, all match results associated with the key are erased at block 1225. The procedure waits for next match inputs at block 1227, which returns the procedure to block 1201. However, a Max_score greater than zero results in details of the matched face being output to the face annotator 176 (shown in FIG. 1) at block 1229.

Additionally, the combiner module 418 obtains a current time at block 1231. A registered score and timestamp for the individual are obtained from memory, such as, for example, cache memory, at block 1233. A variable, such as, for example, a variable named "send", is initialized to a Boolean value of "false". The "send" variable tracks whether the matched face is to be sent to the alerts modifier 124 (shown in FIG. 1) as well. The current time and the registration timestamp are compared at block 1237. If the delta (e.g., the difference) between the timestamp and the current time is greater than a predefined interval, the procedure continues to block 1241 where the "send" variable is updated to a Boolean value of "true".

Returning to block 1237, if the delta between the timestamp and the current time is not greater than the predefined interval, the procedure continues to block 1239 instead. At block 1239, the Max_score is compared to a similarity score of a previous facial match for the individual. If the current Max_score exceeds the previous similarity score by a predefined amount, the procedure continues to block 1241 where the "send" variable is updated to a Boolean value of "true". In the case where the current Max_score does not exceed the previous similarity score by the predefined amount, the procedure continues to block 1243 without having the "send" variable updated to the Boolean value of "true". Also, in the previously described cases where the procedure continued to block 1241, either by way of block 1237 or block 1239, the procedure continues to block 1243 as well. At block 1243, the registration time is updated for the matched individual in the cache, and the registered score is updated to the current Max_score if the "send" variable is set to "true", or if the matched individual is being registered for the first time. Otherwise, the previous similarity score is maintained in the cache for the matched individual.

At block 1245 the "send" variable is checked. If the "send" variable is set to "false", the procedure continues directly to block 1225 where all match results associated with the key are erased. The procedure waits for next match inputs at block 1227, which returns the procedure to block 1201. However, if the "send" variable is set to "true", the procedure continues to block 1247 where the matched face details are transmitted to the alerts modifier 124. Once the transmission to the alerts modifier 124 is completed, the procedure continues to block 1225, erasing all match results associated with the key. The procedure waits for next match inputs at block 1227, which returns the procedure to block 1201.

The process shown in FIG. 12 allows the worker unit to reduce the network traffic by limiting the frequency that a same facial data is transmitted to the alert modifier 124. However, if the facial data acquired is of, for example, a different angle that results in an increased similarity score, the worker unit can transmit the new data to the alert modifier 124 even if the interval has not been surpassed.

Figure 13:
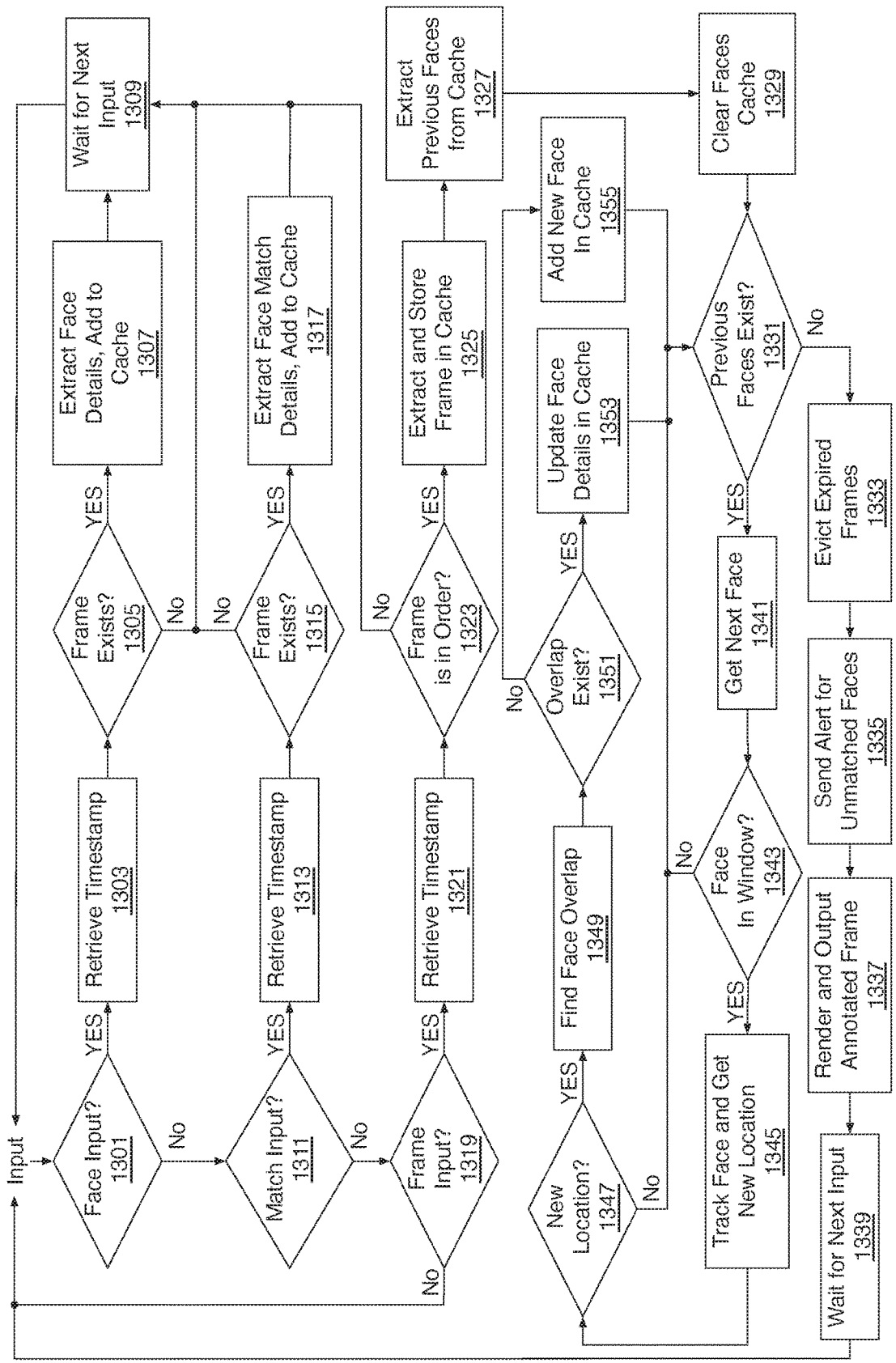
FIG. 13 is a flow diagram illustrating an operational process executed by an annotation module in accordance with an embodiment of the present invention.

Turning to FIG. 13, an operational procedure of an embodiment of an annotation module 518 (shown in FIG. 5) of the face annotation unit 176 (shown in FIG. 1), is illustrated. The annotation module 518 combines inputs received from the detection input block 502, the match input block 506 and the frame input block 504 as described above with respect to FIG. 5. The procedure begins with the receipt of an input. At block 1301 the procedure determines if the received input is a face detection from the detection input block 502. If the input is received from the detection input block 502, the procedure retrieves a timestamp from the input at block 1303. The annotation module 518 checks at block 1305 if an associated frame corresponding to the timestamp exists in cache. If an associated frame does not exist, the annotation module 518 proceeds to block 1309 to wait for a next input, thus returning the procedure to block 1301. However, if an associated frame does exist in cache, the procedure extracts the facial details from the input and adds the details to the cache at block 1307. Upon completion of block 1307, the annotation module 518 proceeds to block 1309 to wait for a next input, thus returning the procedure to block 1301.

However, if at block 1301, the input is determined to not be received from the detection input block 502, a check is performed, at block 1311, to determine if the input is received from the match input block 506. If the input is received from the match input block 506, the procedure retrieves a timestamp from the input at block 1313. The annotation module 518 checks at block 1315 if an associated frame corresponding to the timestamp exists in cache. If an associated frame does not exist, the annotation module 518 proceeds to block 1309 to wait for a next input, thus returning the procedure to block 1301. However, if an associated frame does exist in cache, the procedure extracts the facial details from the input and adds the details to the cache at block 1317. Upon completion of block 1317, the annotation module 518 proceeds to block 1309 to wait for a next input, thus returning the procedure to block 1301.

If the received input is not from the match input block 506, the annotation module 518 continues from block 1311 to 1319, where the procedure determines whether the input is from the frame input block 504. If the input is not received from the frame input block, the procedure waits for a next input and returns to block 1301. However, if the input is received from the frame input block 504, a timestamp is retrieved from the input at block 1321. At block 1323, the procedure determines if the received frame is in order, such that the timestamp of the received frame is correct and follows after the previously received frame input. If the received frame fails the check at block 1323, the procedure continues to block 1309 to wait for a next input, thus returning the procedure to block 1301.

If, however the received frame input passes the check at block 1323, the frame is extracted and stored in cache at block 1325. Previous faces are extracted from cache at block 1327. Additionally, at block 1329, faces from the cache are cleared in order to prepare to render the current frame and get ready for a next frame. A check is performed, at block 1331, to determine if any faces exist to be processed from the faces extracted from the cache. If the check fails, the procedure evicts the expired frames at block 1333. An alert is sent for any faces that do not match individuals on the watchlists at block 1335. Alerts are sent for faces that are above a certain quality threshold, such that the detected face quality is sufficient for matching, but no match was found in the watchlists.

Continuing to block 1337, the annotation module 518 renders the frame, annotates the frame with bounding boxes around the faces, along with names of individuals matched in the watchlists around the bounding box and publishes the annotated frames. The procedure continues to block 1339 to wait for a next input, thus returning the procedure to block 1301.

However, if faces exist for processing, as determined in block 1331, the procedure retrieves the next face for processing at block 1341. At block 1343 the annotation module 518 checks if the face is within the tracking window. Faces the are determined to be outside the tracking window are discarded and the procedure returns to block 1331, continuing as described above. Faces that are within the tracking window are tracked in the current frame using template matching and a new location for the face is determined at block 1345. At block 1347, a check is performed to determine if a new location based on the tracking is found. If the check at block 1347 fails, the procedure returns to block 1331 to continue the process as described above.

If new location is found at block 1347, the annotation module 518 identifies any overlaps between the current face and any other face. The overlap is identified based on the location of the face and a preset threshold. At block 1351, a check is performed to determine if an overlap exists. If an overlap exists, the face details in the cache are updated and the procedure returns to block 1331. If an overlap does not exist, the procedure continues from block 1351 to block 1355 where the new face is added to the cache. The procedure returns to block 1331. The loop including block 1331 and 1341 through 1355 is performed until the check performed at block 1331 determines that no more faces exist to be processed, at which point the procedure continues with blocks 1333 through 1339 as described above.

Figure 14:
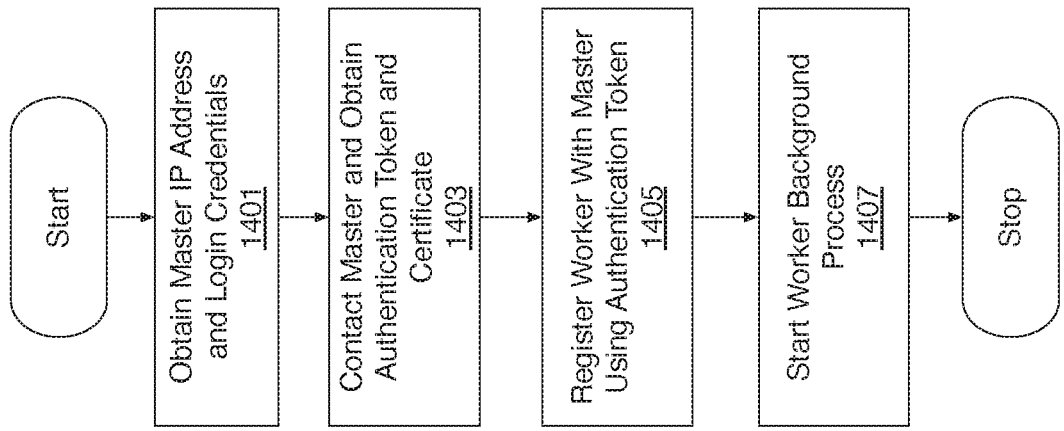
FIG. 14 is a flow diagram of a worker unit registration process in accordance with an embodiment of the present invention.

FIG. 14 illustrates a process executed by embodiments of the present invention when a new worker unit 160 is added to the system 100 shown in FIG. 1. The process for connecting a new worker unit 160 to the master unit 102 begins at block 1401. At block 1401, the new worker unit 160 obtains the address for the master unit 102. The address can include, in some embodiments, an Internet protocol (IP) address and port number on which the security system APIs are exposed. In some embodiments, the worker unit 160 obtains the address by way of an interface provided to an administrator, such that the administrator enters the address and login credentials manually through a command line tool or graphical user interface. In other embodiments, the address is obtained by way of an automated negotiation procedure.

At block 1403 the worker unit 160 receives an authentication token and a secure socket layer (SSL) certificate from the master unit 102. In other embodiments the SSL certificate is replaced with a transport layer security (TLS) certificate. The authentication token and certificate provide a secured, encrypted communication channel between the master unit 102 and the worker unit 160. In some embodiments, the watchlist and other data transmitted from the master unit 102 to the worker unit 160 can be encrypted using a public-private key technique. Moreover, data can also be encrypted when sent from the worker unit 160 to the master unit 102 using a similar public-private key technique.

At block 1405 the worker unit 160 registers with the master unit 102 by providing authentication token, unique device identifier, such as, for example, a media access control (MAC) address, a user assigned name, etc., IP address, and hardware configuration to the master unit 102. The hardware configuration information transmitted to the master unit 102 can include processor information, available memory, available storage space, and imaging information, e.g. resolution, color or monochrome, frame rate, gain, etc. In some embodiments, the worker unit 160 can include a global positioning system (GPS) receiver, and thus the worker unit 160 can provide GPS coordinates to the master unit. In other embodiments, a location description of the worker unit 160 is provided to the master unit 102 manually by an administrator. The location description can include, for example a room identifier, such as front entrance, office, conference room, and the like. In still other embodiment, both GPS coordinates and room identifier can be provided to the master unit 102.

Once the worker unit 160 is registered with the master unit 102 in accordance with block 1405, the worker unit 160 initiates a background process at block 1407. The background process provides all further communication between the worker unit 160 and the master unit 102 using, for example, the authentication token. The background process, in some embodiments, provides periodic status updates of the worker unit 160 to the master unit 102, and receives watchlist updates and operational commands from the master unit 102.

Figure 15:
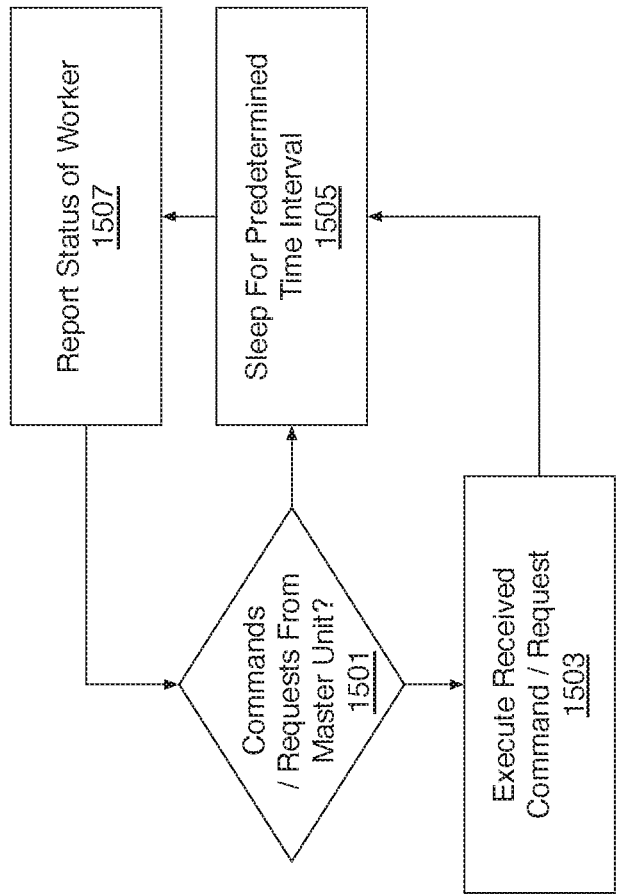
FIG. 15 is a flow diagram of a background worker unit process in accordance with an embodiment of the present invention.

FIG. 15 illustrates operation of an embodiment of the background process initiated at block 1407 of FIG. 14. At block 1501, the background process of the worker unit 160 checks with the master unit 102 for commands/requests instructing the worker unit 160 to start and/or stop any module instances. If a command is received to either start or stop a module instance, the background process proceeds to block 1503. At block 1503, the background process executes the start/stop command for the identified module instance. In some embodiments, a start command can require download of individual modules and configuration files from the master unit 102 if not already present on the worker unit 160. Once the necessary components are present on the worker unit 160, the module instance is started.

Since the master unit 102 can be configured to download modules to the worker unit 160, the system 100 can ensure that all the worker units 160 registered with the master unit 102 are executing the same versions of the various modules described above. Thus, when a module is updated, the update can be propagated from the master unit 102 to all the worker units 160 within a short period of time.

After the start/stop instructions have been successfully executed, the background process proceeding to block 1505, where the process waits for a predetermined interval before continuing to block 1507. If at block 1501 no commands are received from the master unit 102, the background process continues directly to block 1505 as well. At block 1507, the background process transmits a status update to the master unit 102 providing the current status of the worker unit 160. The status update can include, for example, a status of module instances, hardware resources being utilized, hardware resource available, etc. The background process returns to block 1501 and continues as previously described.

Figure 16:
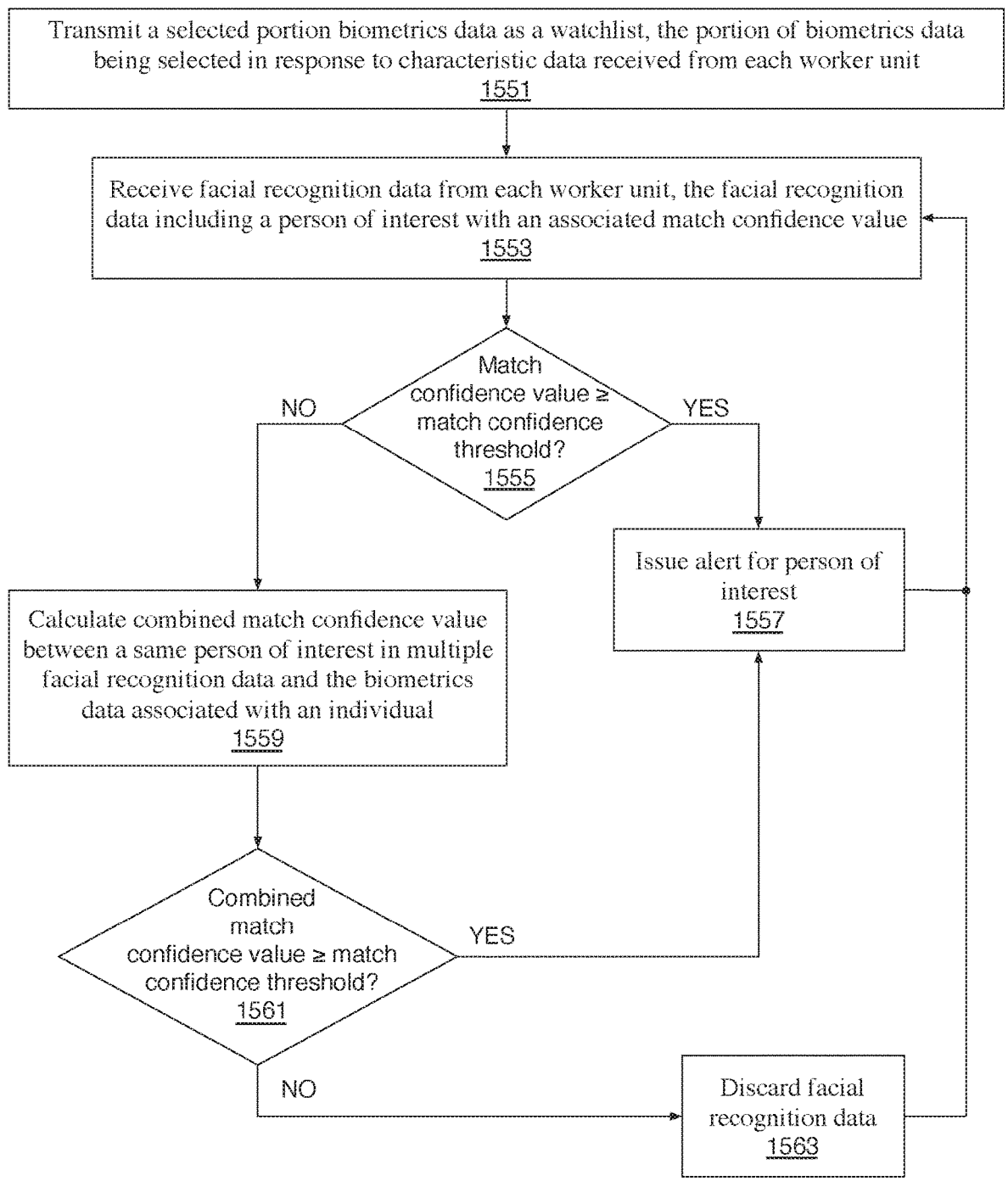
FIG. 16 is a flow diagram of a master unit process in accordance with an embodiment of the present invention

Turning to FIG. 16, a flow diagram is shown illustrating a process executed by some embodiment of the master unit of the present invention. The master unit, such as, for example master unit 102 shown in FIG. 1, transmits, at block 1551, a selected portion of biometrics data as a watchlist to each worker unit, such as worker unit 160 shown in FIG. 1. The portion of biometrics data transmitted to each worker unit is selected in response to respective characteristic data received from each worker unit. In some embodiments, the worker unit 160 can initiate the initial watchlist download by transmitting a watchlist request to the master unit 102 during registration of the worker unit 160 with the master unit 102, as shown in FIG. 14 and FIG. 15. In other embodiments, the master unit 102 initiates the initial watchlist download as part of the registration of the worker unit 160.

Additionally, the master unit 102 checks periodically at block 1551 whether changes have been made to the biometrics database 122. If a change has been made to the biometrics database 122, the master unit 102 updates the watchlist transmitted to the worker unit 160 in response to the changes. In environments where the worker unit 160 is not assigned a static network address and/or the network connectivity is intermittent or unreliable, the watchlist updates can also be initiated by an update request transmitted by the worker unit 160 to the master unit 102.

At block 1553, the master unit 102 receives facial recognition data from each worker unit 160. The facial recognition data includes a person of interest with an associated match confidence value calculated by each worker unit 160 based on respective watchlists received by each worker unit 160. The master unit 102 determines if the match confidence value exceeds a match confidence threshold at block 1555. If the match confidence value exceeds or is equal to the match confidence threshold, the process continues to block 1557 where an alert is issued.

However, if the match confidence value is below the match confidence threshold, the process proceeds to block 1559. At block 1559, the master unit 102 calculates a combined match confidence value between a same person of interest identified in multiple facial recognition data received from each worker unit 160 and the biometrics data associated with an individual. The master unit 102 continues to block 1561 to determine if the combined match confidence value is equal to or exceeds the match confidence threshold. If the combined match confidence value is at least equal to the match confidence threshold at block 1561, the process continues to block 1557 where an alert is issued for the person of interest. However, a combined match confidence value below the match confidence threshold causes the process to discard the facial recognition data for the person of interest at block 1563.

After the master unit 102 has either issued an alert at block 1557 or discarded the facial recognition data at block 1563, the process returns to block 1553. The master unit 102, thus, waits to receive new facial recognition data from the worker units 160.

Figure 17:
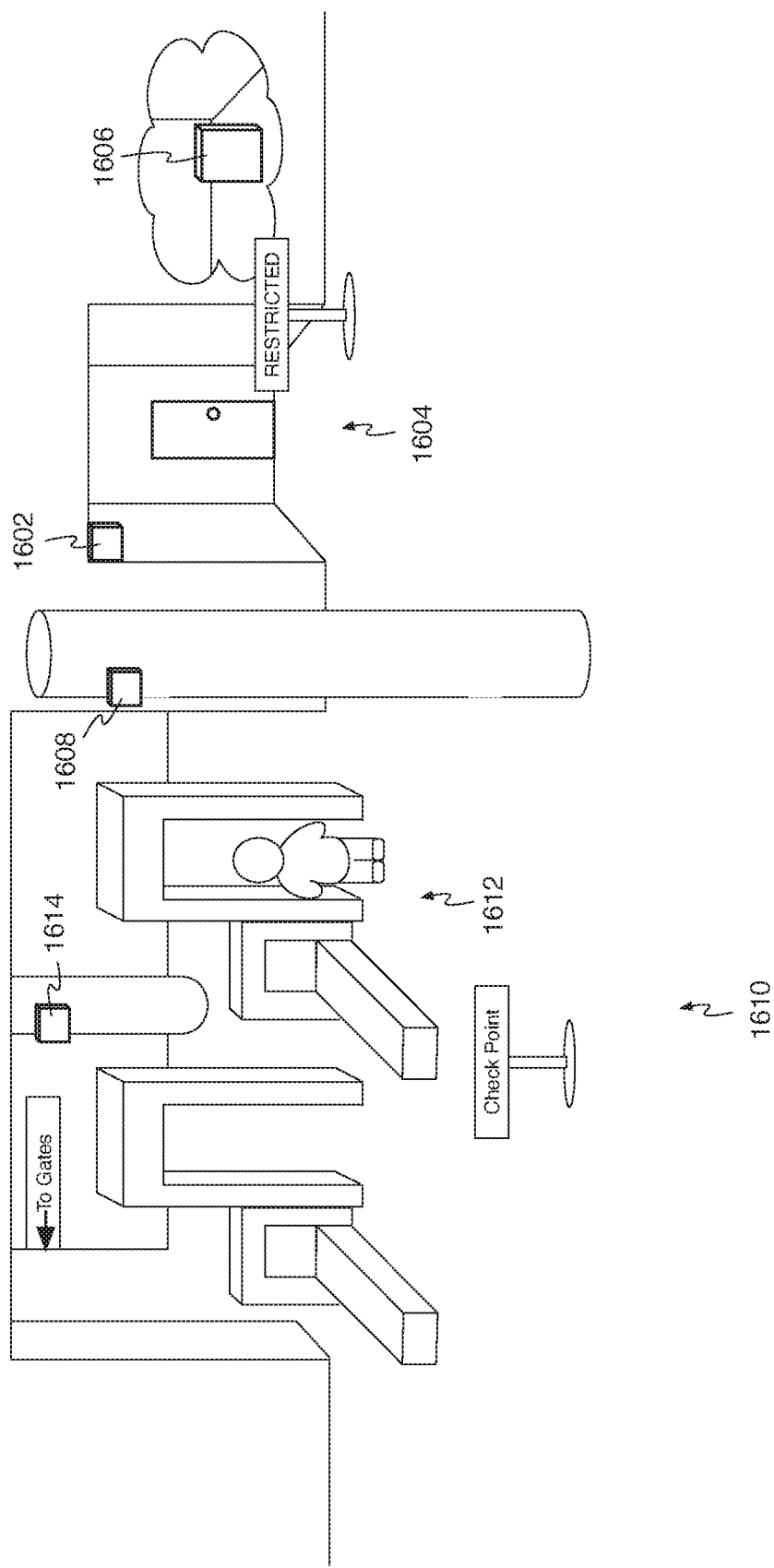
FIG. 17 illustrates an environment implementing a security system in accordance with an embodiment of the present invention.

FIG. 17 illustrates an environment utilizing an embodiment of the present invention. The environment shown in FIG. 17 can be a public facility, such as for example, an airport, or courthouse, a commercial facility, or a park. The particular environment illustrated is an airport terminal 1600. The airport terminal 1600 includes a first worker unit 1602 monitoring a restricted space 1604. The restricted space 1604 can be any area or room in which access is limited to a known group of individuals, such as, for example, security personnel, maintenance personnel, etc. The master unit 1606 can be installed in one such restricted area 1604, for example, in a security office. Additionally, the airport terminal 1600 includes a second worker unit 1608 positioned to monitor a public-accessible area 1610. The public-accessible area 1610 can be, for example, the space outside the security checkpoint 1612. A third worker unit 1614 can be positioned to monitor the space beyond the security checkpoint 1612 leading to individual gates, for example, the space beyond the security checkpoint 1612, will be referend to hereinafter as a secured area.

Regarding the first worker unit 1602, a first watchlist is transmitted from the master unit 1606 to the first worker unit 1602 that includes facial information for individuals that are permitted to enter the restricted area 1604. Thus, the first worker unit 1602 executes the process described above such that an individual that is not on the first watchlist is considered a person of interest. Consequently, when the first worker unit 1602 observers a person of interest (an individual not on the first watchlist) entering the restricted area 1604, the first worker unit 1602 sends the unmatched face data (such as the unmatched face data 524 shown in FIG. 5) to the master unit 1606, which in turn can issue an alert.

The second worker unit 1608 and the third worker unit 1614, on the other hand, are monitoring spaces open to the general public. Thus, a second watchlist received by the second worker unit 1608 and the third worker unit 1614 from the master unit 1606 includes facial data of individuals that are persons of interest, e.g., individuals that may be wanted by authorities or otherwise barred from entering the location. Consequently, when the second worker unit 1608, for example, observes a person of interest (an individual on the second watchlist) in the public-accessible area 1610, the second worker unit 1608 sends the matched face data (such as the facial match data 420 shown in FIG. 4) to the master unit 1606, which in turn can issue an alert.

In some embodiments, the third worker unit 1614 can be configured to receive the second watchlist that include persons of interest, e.g., individuals that may be wanted by authorities, and a third watchlist that includes individuals that are permitted to be beyond the security checkpoint 1612. The third watchlist can be a watchlist generated by security personnel at the security zone 1612. As an individual is permitted to cross the security checkpoint 1612, the facial data and other relevant information is transmitted to the master unit 1606, where the facial data and other relevant information is added to the third watchlist. The third watchlist can then be transmitted to the third worker unit 1614 and any other worker units in the secured area. An individual on the third watchlist can be removed therefrom by the master unit when the individual is observed leaving the secured area, for example, by boarding an airplane. In this way, the third worker unit 1614 ensures that only individuals that have successfully crossed the security checkpoint 1612 are in the secured area; all other individuals will trigger an alert.

In other embodiments implemented at an airport terminal, fourth watchlists can be generated by the master unit 1606 that include individuals that allowed to board specific flights. The fourth watchlists can be generated by the master unit 1606 based on data received from the security checkpoint 1612 since a boarding pass, listing flight details, can be presented to the security personnel stationed there. The fourth watchlists can then be transmitted by the master unit 1606 to the appropriately located worker units monitoring the respective gates.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for distributed real-time security monitoring and alerting, comprising:
    transmitting a selected portion of biometrics data as a watchlist to each worker unit of a plurality of worker units, the portion of biometrics data being selected in response to respective characteristic data received from each worker unit, a location for the characteristic data being set as a relative position for at least one of the plurality of worker units;
    receiving facial recognition data from each worker unit, the facial recognition data including a person of interest with an associated match confidence value calculated by each worker unit based on respective watchlists received by each worker unit; and
    calculating a combined match confidence value between a same person of interest identified in multiple facial recognition data received from each worker unit and the biometric data associated with an individual, the combined match confidence value being calculated in response to match confidence values associated with the same person of interest in respective facial recognition data being below a match confidence threshold, the match confidence threshold being determined based on a different worker unit confidence threshold and a master unit confidence threshold, the worker unit confidence being set at a lower value than the master unit confidence threshold.

2. The method as in claim 1, further comprising updating the watchlist transmitted to each worker unit in response to changes made to the biometrics data.

3. The method as in claim 1, wherein receiving characteristic data includes receiving respective characteristic data from each of the plurality of worker units.

4. The method as in claim 3, wherein:
    a first characteristic data of a first worker unit of the plurality of worker units identifying the monitoring focus of the first worker unit as a public space, and the watchlist transmitted to the first worker unit including biometric data for persons of interest, and
    a second characteristic data of a second worker unit of the plurality of worker units identifying the monitoring focus of the second worker unit as a secured space, and the watchlist transmitted to the second worker unit including biometric data for individuals authorized to enter the secured space.

5. The method as in claim 1, further comprising issuing an alert in response to at least one of a match confidence value or a combined match confidence value at least equaling a match confidence threshold.

6. The method as in claim 1, wherein a first facial recognition data and a second facial recognition data, each including the same person of interest having a match confidence value below the match confidence threshold, is received from a same worker unit, the first facial recognition data and the second facial recognition data being associated with respective image frames recorded at different times; and
    the combined match confidence value is calculated based on the first facial recognition data and the second facial recognition data received from the same worker unit.

7. The method as in claim 1, wherein a first facial recognition data, received from a first worker unit, and a second facial recognition data, received from a second worker unit, each include the same person of interest having a match confidence value below the match confidence threshold; and
    the combined match confidence value is calculated based on the first facial recognition data and the second facial recognition data received from the first worker unit and the second worker unit.

8. A method for distributed real-time security monitoring and alerting, comprising:
    transmitting characteristic data identifying at least a location and monitoring focus of a plurality of worker units to a management server, a location for the characteristic data being set as a relative position for at least one of the plurality of worker units;
    receiving at least one watchlist from the management server, the watchlist including biometric data of individuals representing a portion of biometric data managed by the management server selected based on the characteristic data;
    identifying a person of interest using facial recognition based on the biometric data of the watchlist received from the management server;
    labeling the person of interest in the image data including calculating a match confidence value between a same person of interest identified in multiple facial recognition data received from each worker unit and the biometric data associated with an individual, the combined match confidence value being calculated in response to match confidence values associated with the same person of interest in respective facial recognition data being below a match confidence threshold, the match confidence threshold being determined based on a different worker unit confidence threshold and a master unit confidence threshold, the worker unit confidence being set at a lower value than the master unit confidence threshold; and
    transmitting an alert request including the image data having a labeled person of interest to the management server.

9. The method as in claim 8, wherein identifying a person of interest further includes:
    identifying individual faces in an image frame captured by an imaging system; and
    matching the individual faces with individuals using the watchlist received from the management server.

10. The method as in claim 8, wherein issuing an alert request further includes annotating each face identified as a person of interest in an image frame prior to transmitting the facial recognition data to the management server, each face identified as a person of interest being annotated with an identifier associated with an individual on the watchlist and a match confidence value calculated based on the biometric data in the watchlist.

11. The method as in claim 8, wherein issuing an alert request further includes annotating each face identified as a person of interest in an image frame prior to transmitting the facial recognition data to the management server, each face identified as a person of interest being annotated with an identifier indicating that the face is unmatched with an individual on the watchlist based on the biometric data in the watchlist.

12. A system for distributed security monitoring and alerting, comprising:
one or more worker units including an imaging system, and positioned to monitor individuals in a space; and
a management server configured to:
transmit a selected portion of biometrics data as a watchlist to each worker unit of the one or more worker units, the portion of biometrics data being selected in response to respective characteristic data received from each worker unit, a location for the characteristic data being set as a relative position for at least one of the one or more worker units,
receive facial recognition data from each worker unit, the facial recognition data including a person of interest with an associated match confidence value calculated by each worker unit based on respective watchlists received by each worker unit,
calculate a combined match confidence value between a same person of interest identified in multiple facial recognition data received from each worker unit and the biometric data associated with an individual, the combined match confidence value being calculated in response to match confidence values associated with the same person of interest in respective facial recognition data being below a match confidence threshold, the match confidence threshold being determined based on a different worker unit confidence threshold and a master unit confidence threshold, the worker unit confidence being set at a lower value than the master unit confidence threshold, and
issue an alert in response to at least one of a match confidence value or a combined match confidence value at least equaling the match confidence threshold.

13. The system as in claim 12, wherein the management server is further configured to update the watchlist transmitted to each worker unit in response to changes made to the biometrics data.

14. The system as in claim 12, wherein:
a first characteristic data of a first worker unit identifies the monitoring focus of the first worker unit as a public space, and the watchlist transmitted to the first worker unit includes biometric data for persons of interest, and
a second characteristic data of a second worker unit identifies the monitoring focus of the second worker unit as a secured space, and the watchlist transmitted to the second worker unit includes biometric data for individuals authorized to enter the secured space.

15. The system as in claim 14, wherein a first facial recognition data and a second facial recognition data, each including the same person of interest having a match confidence value below the match confidence threshold, is received from a same worker unit, the first facial recognition data and the second facial recognition data being associated with respective image frames recorded at different times; and
the combined match confidence value is calculated based on the first facial recognition data and the second facial recognition data received from the same worker unit.

16. The system as in claim 14, wherein a first facial recognition data, received from a first worker unit, and a second facial recognition data, received from a first worker unit, each include the same person of interest having a match confidence value below the match confidence threshold; and
the combined match confidence value is calculated based on the first facial recognition data and the second facial recognition data received from the first worker unit and the second worker unit.

17. The system as in claim 12, wherein each of the one or more worker units includes:
a face detection module configured to identify individual faces in an image frame captured by the imaging system; and
a face matching module configured to match faces detected by the face detection module with the one or more individuals using the watchlist received from the management server.

18. The system as in claim 17, wherein the each of the one or more worker units includes an annotation module configured to annotate each face identified as a person of interest in an image frame prior to transmitting the facial recognition data to the management server, each face identified as a person of interest being annotated with an identifier and a match confidence value calculated based on the biometric data in the watchlist.

19. The system as in claim 17, wherein the annotation module generates a match confidence value responsive to a first facial recognition data of a person of interest identified in a first image frame and a second facial recognition data of the person of interest identified in a second image frame recorded at a different time than the first image frame.

20. The system as in claim 17, wherein the each of the one or more worker units includes an annotation module configured to annotate each face identified as a person of interest in an image frame prior to transmitting the facial recognition data to the management server, each face identified as a person of interest being annotated with an identifier indicating that the face is unmatched with individuals on the watchlist.

* * * * *